United States Patent
Grandl et al.

(10) Patent No.: US 11,118,917 B2
(45) Date of Patent: Sep. 14, 2021

(54) LAND MAPPING AND GUIDANCE SYSTEM

(71) Applicants: AGCO International GmbH, Neuhausen (CH); AGCO CORPORATION, Duluth, GA (US)

(72) Inventors: Ludwig Grandl, Olching (DE); Pitt Oppermann, Marktoberdorf (DE)

(73) Assignee: AGCO International GmbH, Neuhausen (CH)

(*) Notice: Subject to any disclaimer, the term of this patent is extended or adjusted under 35 U.S.C. 154(b) by 130 days.

(21) Appl. No.: 16/344,588

(22) PCT Filed: Oct. 23, 2017

(86) PCT No.: PCT/US2017/057806
§ 371 (c)(1),
(2) Date: Apr. 24, 2019

(87) PCT Pub. No.: WO2018/080961
PCT Pub. Date: May 3, 2018

(65) Prior Publication Data
US 2020/0049514 A1 Feb. 13, 2020

Related U.S. Application Data
(60) Provisional application No. 62/411,779, filed on Oct. 24, 2016.

(51) Int. Cl.
*G01C 21/32* (2006.01)
*G01C 7/04* (2006.01)
(Continued)

(52) U.S. Cl.
CPC .............. *G01C 21/32* (2013.01); *G01C 7/04* (2013.01); *G05D 1/0088* (2013.01);
(Continued)

(58) Field of Classification Search
CPC ........ G01C 21/32; G01C 7/04; G05D 1/0088; G05D 1/0094; G05D 1/0219;
(Continued)

(56) References Cited

U.S. PATENT DOCUMENTS

| 4,700,301 A * | 10/1987 | Dyke ...................... G01S 5/16 180/169 |
| 6,463,374 B1 * | 10/2002 | Keller ................... A01B 69/007 111/200 |

(Continued)

FOREIGN PATENT DOCUMENTS

| DE | 10 2005 018206 A1 | 11/2006 |
| EP | 2 980 669 A2 | 2/2016 |

OTHER PUBLICATIONS

European Patent Office, International Search Report for related International Application No. PCT/US2017/057806, dated Jan. 5, 2018.

*Primary Examiner* — Babar Sarwar

(57) ABSTRACT

A system and method for generating land maps of a land area. The land maps can include two-dimensional and three-dimensional land maps. The land maps may be efficiently generated based on field data obtained by mobile machines configured to traverse the land area, with the mobile machines associated with one or more sensors. The land maps may be used to accurately and efficiently guide other mobile machines as such mobile machines traverse through or operate within the land area.

16 Claims, 26 Drawing Sheets

(51) Int. Cl.
  *G05D 1/00*   (2006.01)
  *G05D 1/02*   (2020.01)
  *G06T 17/05*  (2011.01)
  *G06T 7/10*   (2017.01)
  *G06T 11/00*  (2006.01)
  *G09B 29/12*  (2006.01)

(52) U.S. Cl.
  CPC ......... *G05D 1/0219* (2013.01); *G05D 1/0274* (2013.01); *G05D 1/0278* (2013.01); *G05D 1/0291* (2013.01); *G06T 7/10* (2017.01); *G06T 11/00* (2013.01); *G06T 17/05* (2013.01); *G05D 1/0094* (2013.01); *G05D 2201/0201* (2013.01); *G05D 2201/0207* (2013.01); *G09B 29/12* (2013.01)

(58) Field of Classification Search
  CPC .. G05D 1/0274; G05D 1/0278; G05D 1/0291; G05D 2201/0201; G05D 2201/0207; G06T 11/00; G06T 17/05; G06T 7/10; G09B 29/12
  See application file for complete search history.

(56) References Cited

U.S. PATENT DOCUMENTS

| | | | | |
|---|---|---|---|---|
| 6,678,590 | B1 * | 1/2004 | Burchfiel | G05D 1/0214 348/116 |
| 6,703,973 | B1 * | 3/2004 | Nichols | G01S 19/14 342/357.36 |
| 6,728,607 | B1 * | 4/2004 | Anderson | A01B 69/008 340/995.19 |
| 6,789,014 | B1 * | 9/2004 | Rekow | G01C 21/165 180/9.38 |
| 6,876,920 | B1 * | 4/2005 | Mailer | A01B 69/00 701/470 |
| 9,420,737 | B2 * | 8/2016 | Spiller | A01B 69/008 |
| 10,185,317 | B2 * | 1/2019 | Pichlmaier | G05D 1/0016 |
| 2008/0103694 | A1 * | 5/2008 | Dix | A01B 69/008 701/425 |
| 2009/0234499 | A1 * | 9/2009 | Nielsen | B25J 9/1666 700/250 |
| 2009/0312948 | A1 * | 12/2009 | Matthews | G05D 1/0278 701/472 |
| 2012/0029809 | A1 * | 2/2012 | Lee | G01C 21/3647 701/523 |
| 2012/0174445 | A1 * | 7/2012 | Jones | A01B 79/005 37/197 |
| 2012/0296529 | A1 * | 11/2012 | Peake | A01B 69/008 701/50 |
| 2013/0169685 | A1 * | 7/2013 | Lynch | G06T 7/521 345/634 |
| 2013/0311031 | A1 * | 11/2013 | Friend | E02F 9/2054 701/26 |
| 2014/0172225 | A1 * | 6/2014 | Matthews | G05D 1/0274 701/25 |
| 2014/0324291 | A1 * | 10/2014 | Jones | G05D 1/0278 701/41 |
| 2015/0142250 | A1 * | 5/2015 | Cavender-Bares | A01C 7/004 701/23 |
| 2015/0346728 | A1 * | 12/2015 | Peake | G05D 1/0219 701/23 |
| 2016/0029545 | A1 * | 2/2016 | Matthews | G05D 1/0274 701/28 |
| 2017/0084077 | A1 * | 3/2017 | Liu | G06T 17/05 |
| 2017/0336787 | A1 * | 11/2017 | Pichlmaier | G05D 1/0274 |

* cited by examiner

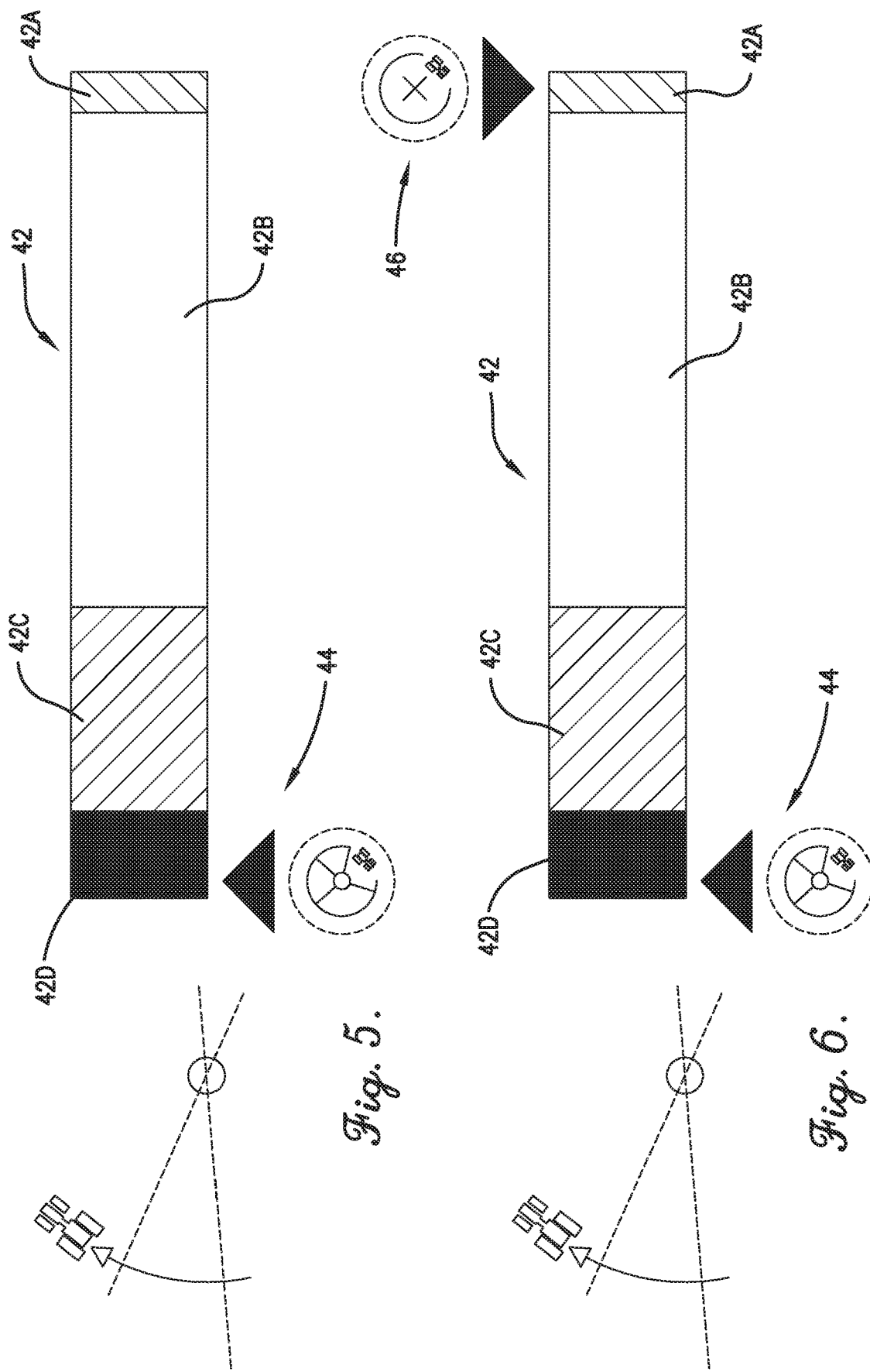

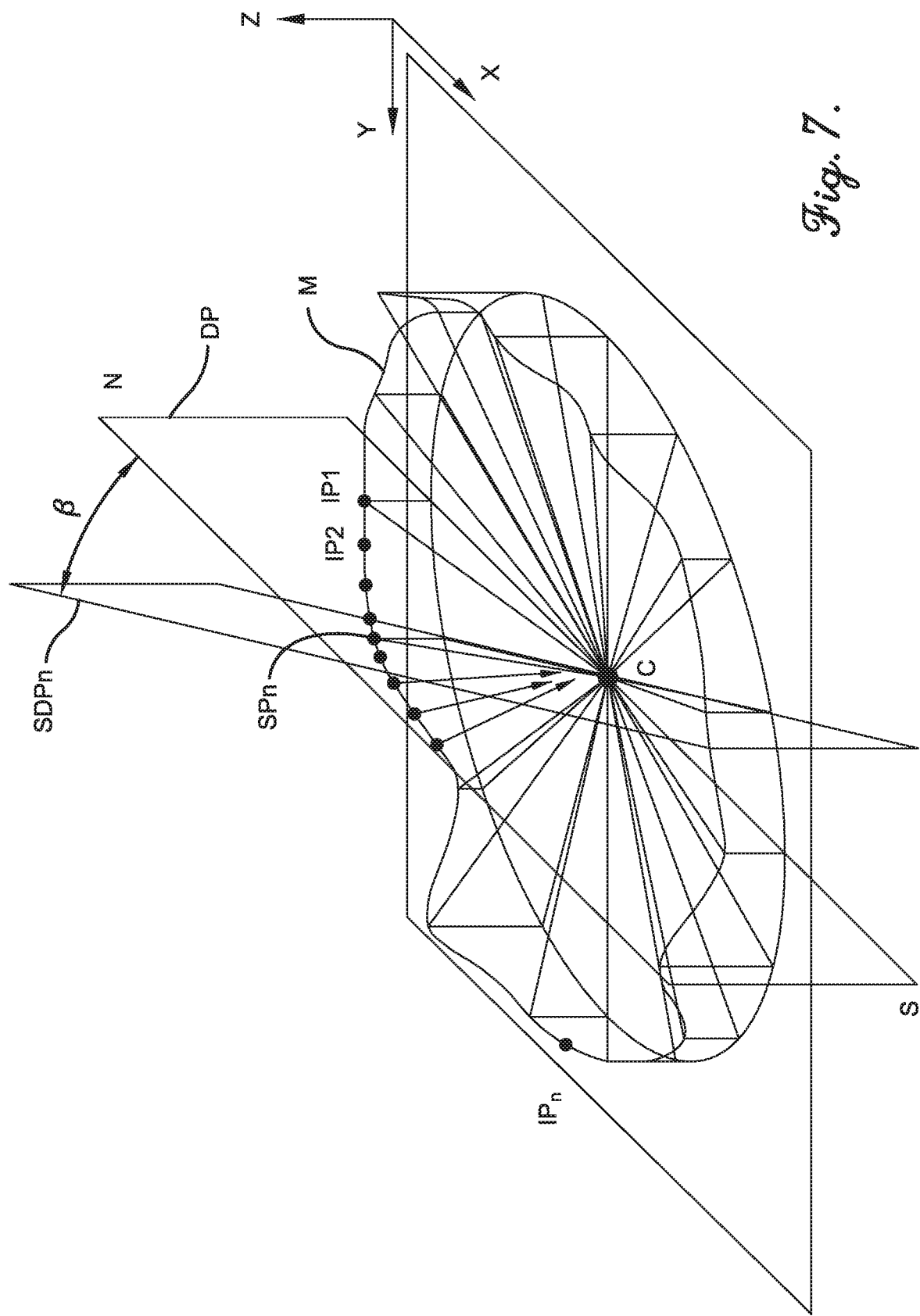

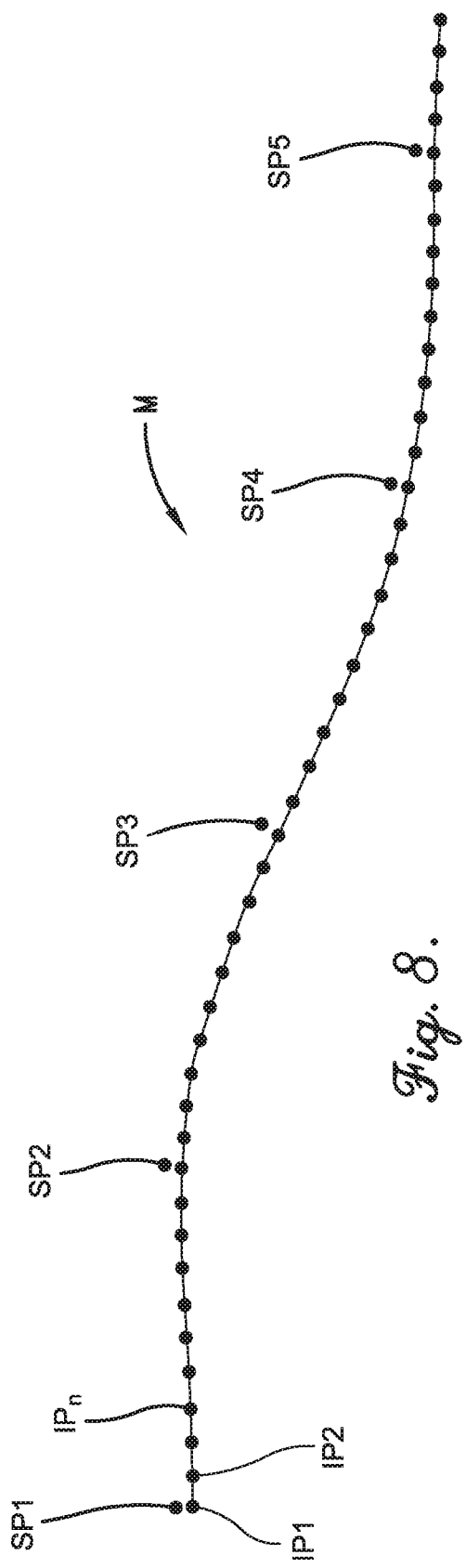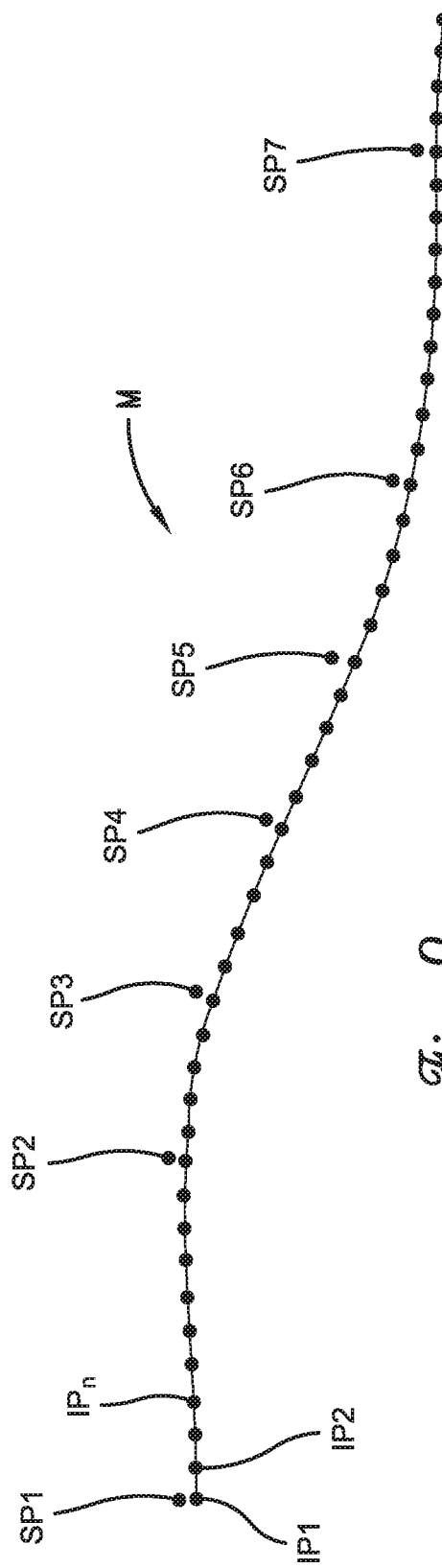

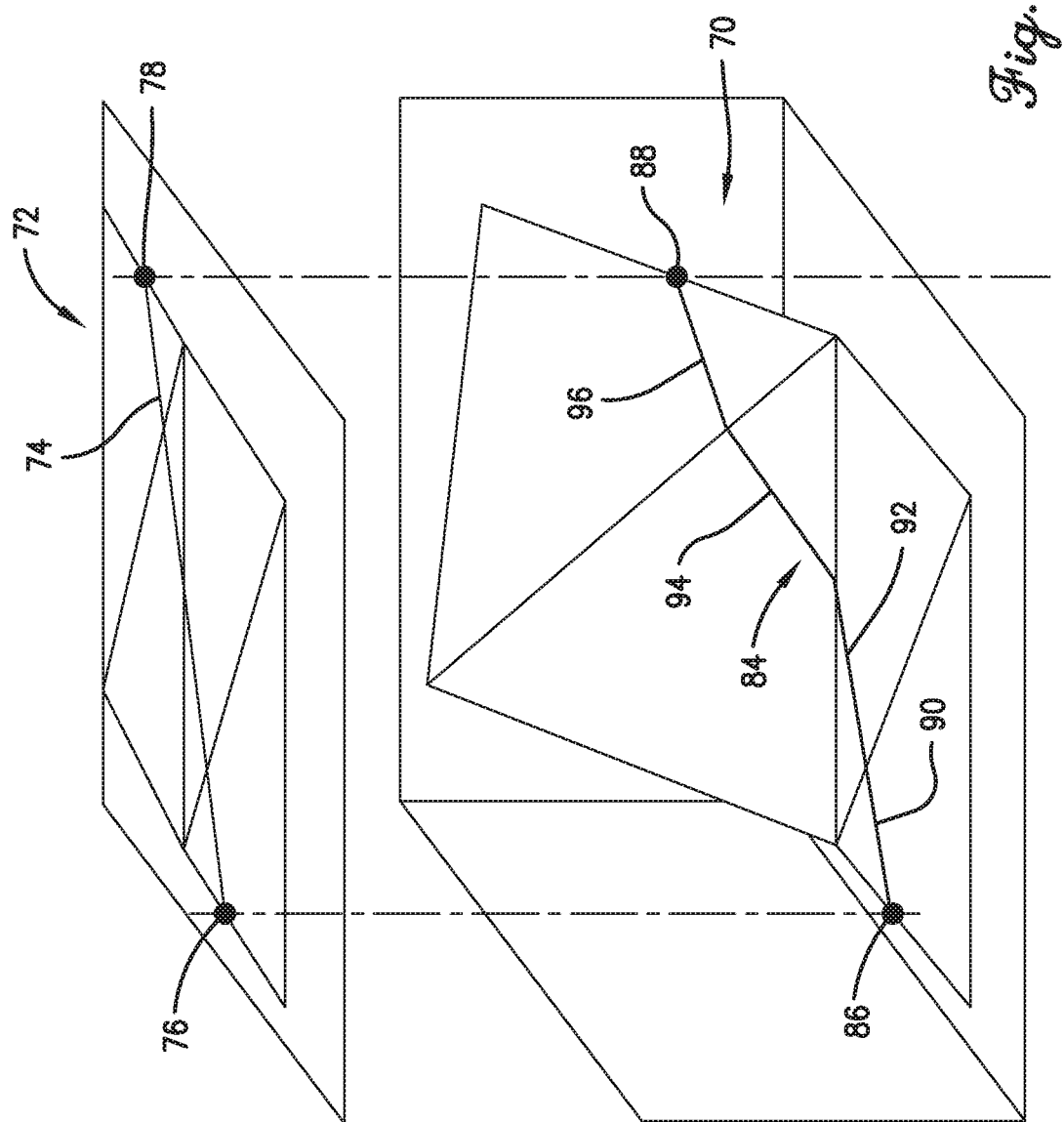

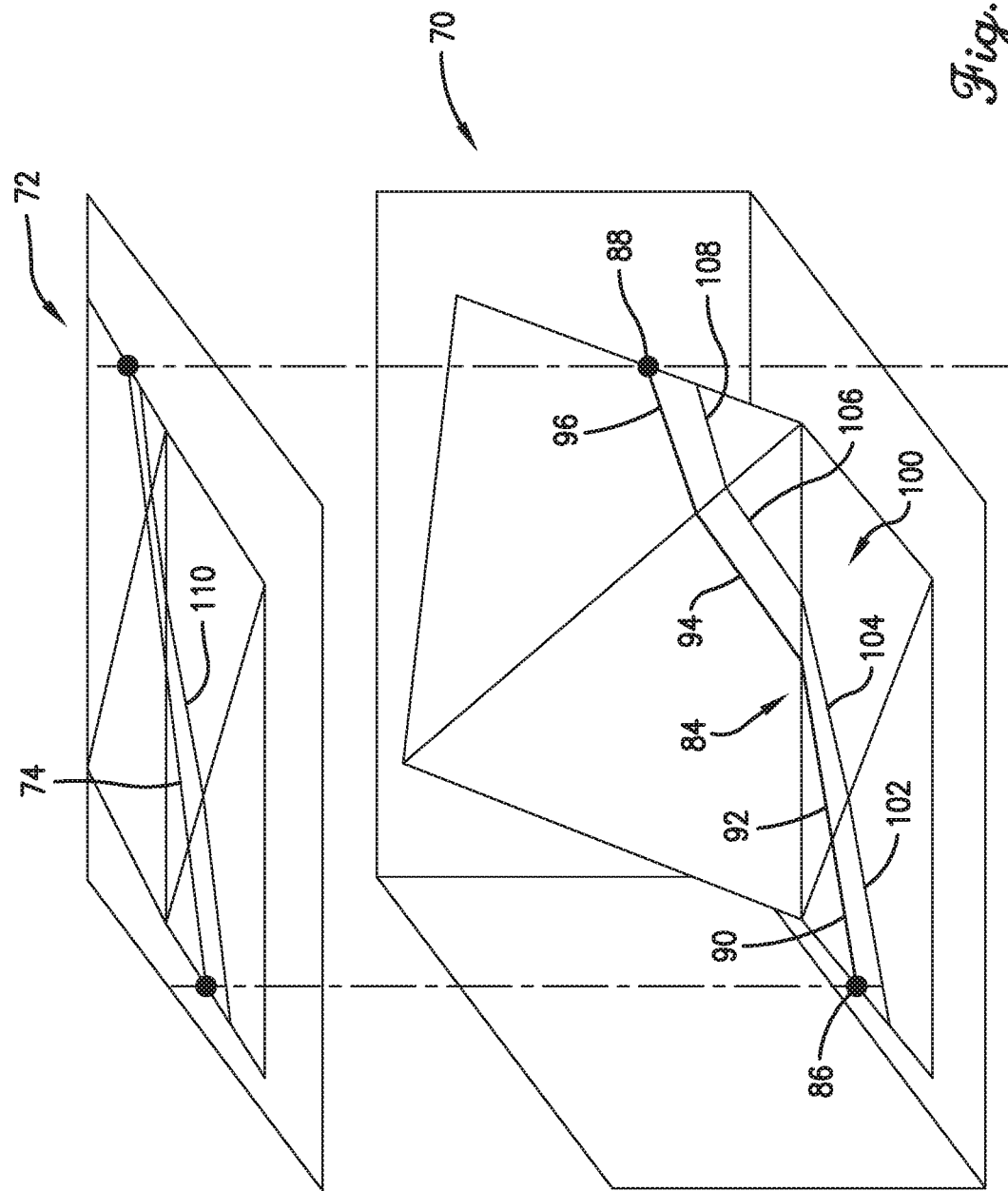

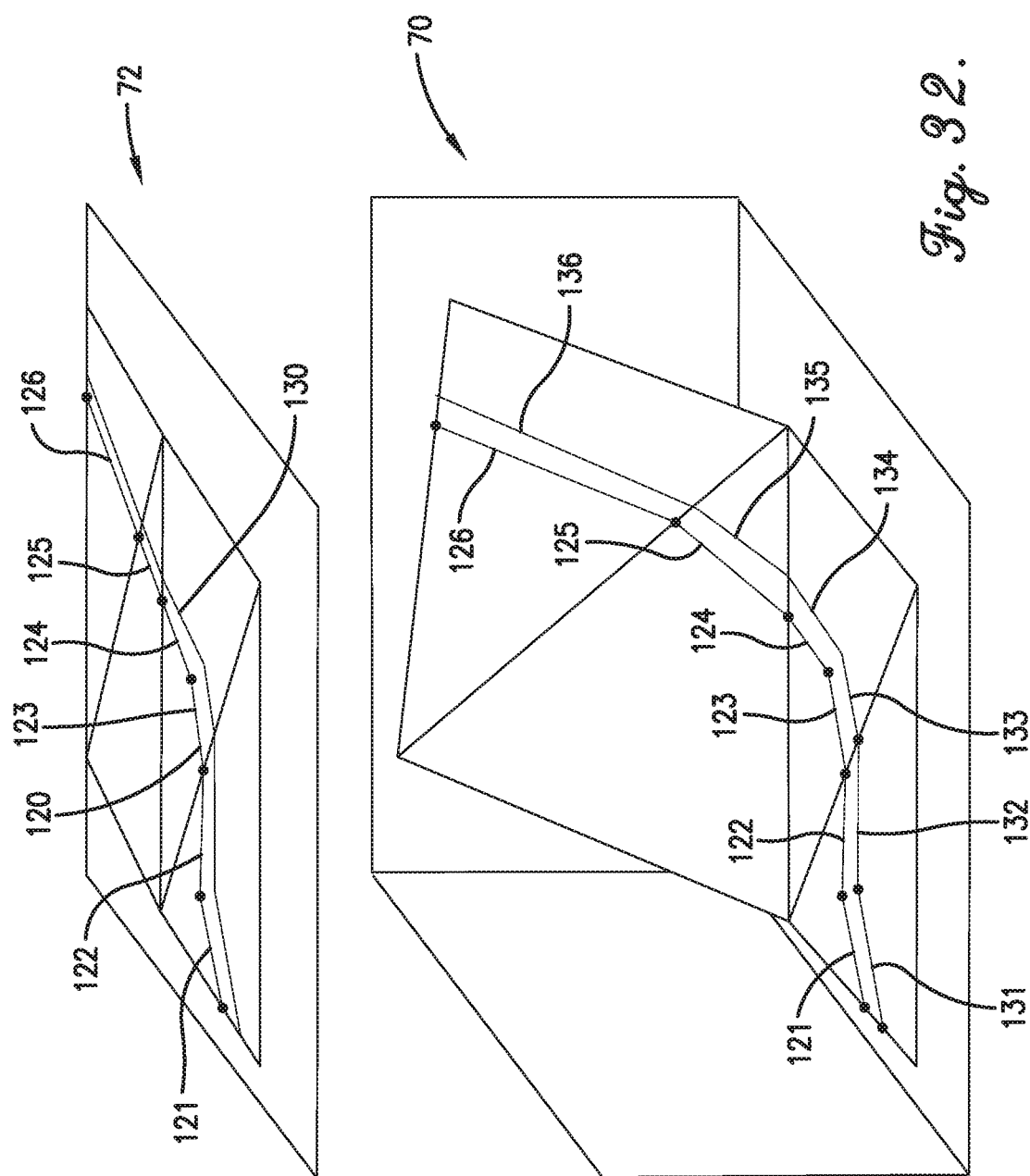

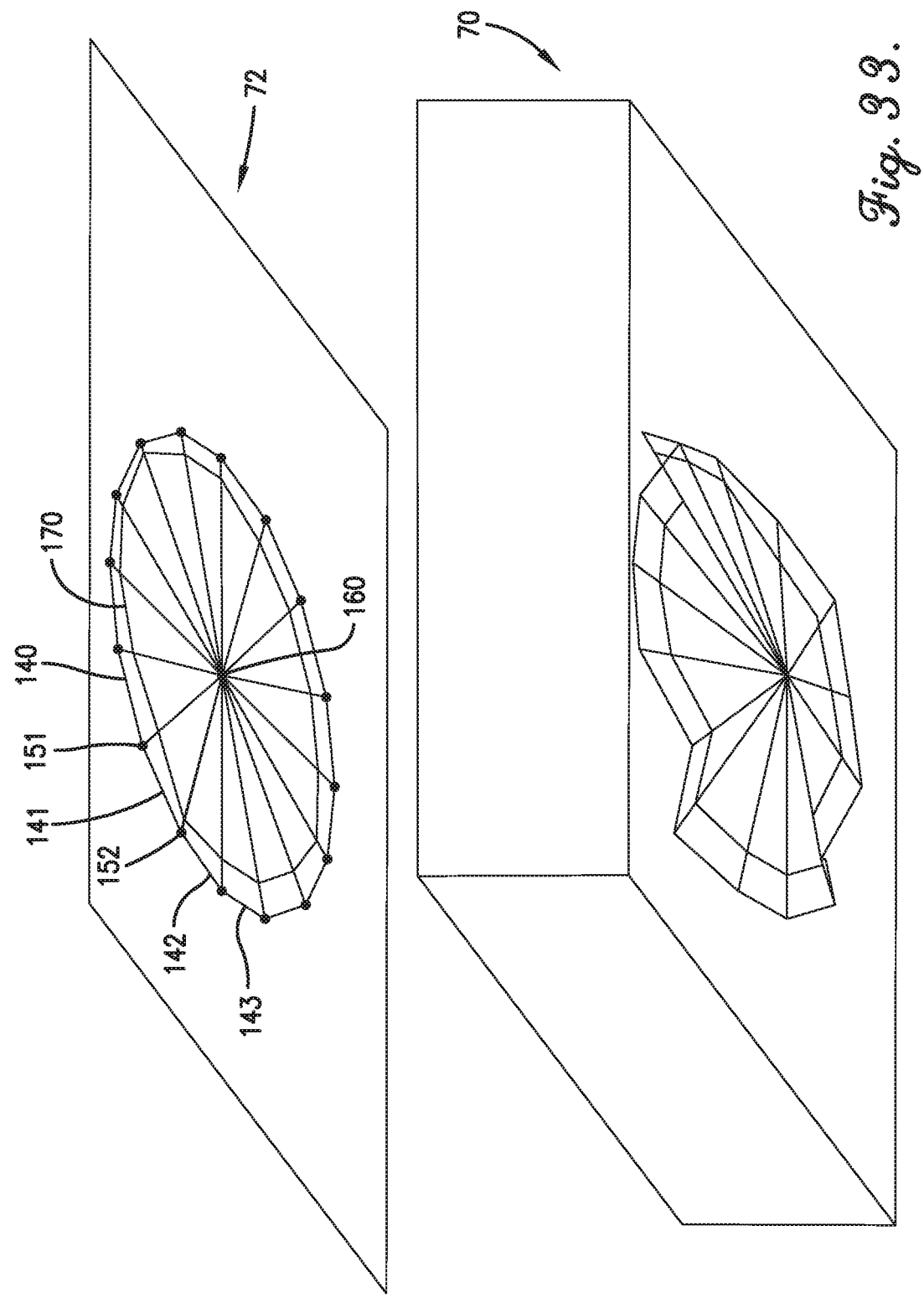

LAND MAPPING AND GUIDANCE SYSTEM

CROSS-REFERENCE TO RELATED APPLICATION

This non-provisional patent application claims priority to U.S. Provisional Patent Application Ser. No. 62/411,779, entitled "Automated guidance with three dimensional terrain analysis," filed on Oct. 24, 2016. The entirety of the above-identified provisional patent application is hereby incorporated by reference into the present non-provisional patent application.

FIELD OF THE INVENTION

The present disclosure generally relates to systems and methods for land mapping and machine guidance. More particularly, the present invention is directed to systems and methods for mapping land areas and for using such maps to guide mobile machines operating or otherwise traversing through such land areas.

BACKGROUND

Agricultural and other heavy-equipment machinery commonly use automated guidance systems to assist users in operating the machines through land areas, such as through crop fields. For example, an automated guidance system may be used to control a machine's speed and steering in order to, for example, direct the machine along a precise path through a field. Such guidance systems are especially important when machines are working large, uneven, and/or unusual-shaped fields, as such guidance systems can maximize efficiency by selecting a path or pattern of paths that minimizes time in the field and/or that maximizes operational efficiency of the machines.

Guidance systems are generally configured to control a machine's traversal through a field based on available digital maps of the field. Often, such maps will include simple, two-dimensional representations of the field's topological features (e.g., terrain). Such two-dimensional maps will represent the field's terrain with reference to a plane perpendicular to the earth's center (i.e., a reference plane), with such reference plane often being tangent to a flat surface of the earth and/or a reference ellipsoid (e.g., WGS-84). Thus, such two-dimensional maps are similar to a top plan view of the field, such as might be expected from a satellite image.

However, for fields with uneven, undulating, and/or sloped terrain, or with terrain that otherwise includes summits, breaks, ridges, valleys, pits, and cols, use of two-dimensional maps often results in deviations from the field's actual terrain because the height and slope/gradient of the field's actual terrain will not accurately correspond with the reference plane of the two-dimensional map. Such inconsistencies are often not appropriately taken into consideration by a machine's guidance systems, which can lead to inaccurate and/or inefficient control of the machine through the field.

Other guidance systems may use more complex three-dimensional maps, which include a three-dimensional representation of a field, including height values (i.e., Z-coordinate data) and lateral values (i.e., X, Y-coordinate data) for the field. However, it is often difficult to obtain such three-dimensional maps with the appropriate level of precision needed to achieve the required level of accuracy for the particular work to be performed within the field. For instance, too little data, and the guidance system may lead to inaccurate and/or inefficient control of the machine through the field. Too much data, and the guidance system may become inefficient and may, more generally, bog down due to the requirements of data storage and data processing.

BRIEF SUMMARY

Embodiments of the present invention include a mapping system for generating terrain-adjusted paths on a two-dimensional land map of a land area. The mapping system comprises a mobile machine for traversing a path around the land area. The mapping system additionally comprises at least one sensor associated with the mobile machine, with the sensor being configured to capture position data as the mobile machine traverses the path. The mapping system further comprises a mapping device including a processor and a non-transitory computer readable storage medium with a computer program stored thereon. The computer program instructs the processor to perform a number of steps. One step includes receiving position data indicative of the path around the land area. The position data may be used to generate a three-dimensional model path representative of the path around the land area. An additional step includes generating a reference path on the two-dimensional land map, with the reference path being indicative of the three-dimensional model path. An additional step includes determining a center point for the model path. An additional step includes partitioning the model path into a plurality of segments, with each segment including a segmentation point lying on the model path. An additional step includes determining a radial vector between the center point and each segmentation point. A further step includes generating one or more subsequent paths on the two-dimensional land map, with the subsequent paths being spaced apart from the reference path by a distance that is based, in part, on the radial vectors.

Embodiments of the present invention may additionally include a mapping system for generating terrain-adjusted paths on a two-dimensional land map of a land area. The mapping system comprises one or more computing devices configured to perform a number of steps. Once step includes receiving position data from one or more position determining sensors, with the position data being indicative of a path around a portion of the land area. An additional step includes generating a three-dimensional model path representative of the path around the land area. An additional step includes projecting the model path onto the two-dimensional land map to obtain a reference path on the two-dimensional land map. An additional step includes determining a center point for the model path. An additional step includes identifying a segmentation point lying on the model path. An additional step includes determining a radial vector between the center point and the segmentation point. A further step includes generating one or more subsequent paths on the two-dimensional land map, with the subsequent paths being spaced apart from the reference path by a distance that is based, in part, on an angle of the radial vector.

Embodiments of the present invention may additionally include a mapping system for generating terrain-adjusted paths on a two-dimensional land map of a land area. The mapping system comprises one or more computing devices configured to perform a number of steps. One step includes receiving position data from one or more position determining sensors, with the position data being indicative of two or more paths through a portion of the land area. An additional step includes generating a three-dimensional model path for each path through the land area. An additional step includes intersecting the model paths with a datum plane, with the intersection of the datum plane at each model path corresponds with a segmentation point. An additional step includes determining a height vector between adjacent segmentation points. A further step includes generating one or more subsequent paths on the two-dimensional land map, with the subsequent paths being spaced apart from one another by a distance that is based, in part, on the height vector.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of embodiments of the present invention. Wherever possible, the following description refers to the reference numerals included in the Figures, in which features depicted in multiple Figures are designated with consistent reference numerals. The present embodiments are not limited to the precise arrangements and instrumentalities shown in the Figures.

FIG. 5 is a graphic depiction of status bar displayable to illustrate a quality of a drive along a route through a field;

FIG. 6 is another graphic depiction of a status bar displayable to illustrate a quality of a drive along a route through a field;

FIG. 7 is a graphic depiction of the model pivot path from FIG. 4 being segmented via a segmentation plane;

FIG. 8 is a graphic depiction of a portion of a model pivot path having a plurality of segmentation points formed thereon;

FIG. 9 is another graphic depiction of a portion of a model pivot path having a plurality of segmentation points formed thereon;

FIG. 30 is a graphic depiction of a straight-line segment on a two-dimensional land map of a field being projected onto a triangulated irregular network representing a three-dimensional surface contour of the field; and FIG. 31 is a graphic depiction a parallel straight-line segment being formed on the triangulated irregular network from FIG. 30, and with the parallel straight-line segment being projected onto the two-dimensional land map.

FIG. 32 is a graphic depiction of a contoured wayline comprising multiple segments being projected onto a two-dimensional land map.

FIG. 33 is a graphic depiction of a pivot wayline comprising multiple line segments with start points and end points lying on a circle about a center point, being projected onto a two-dimensional land map.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

Figure 1:
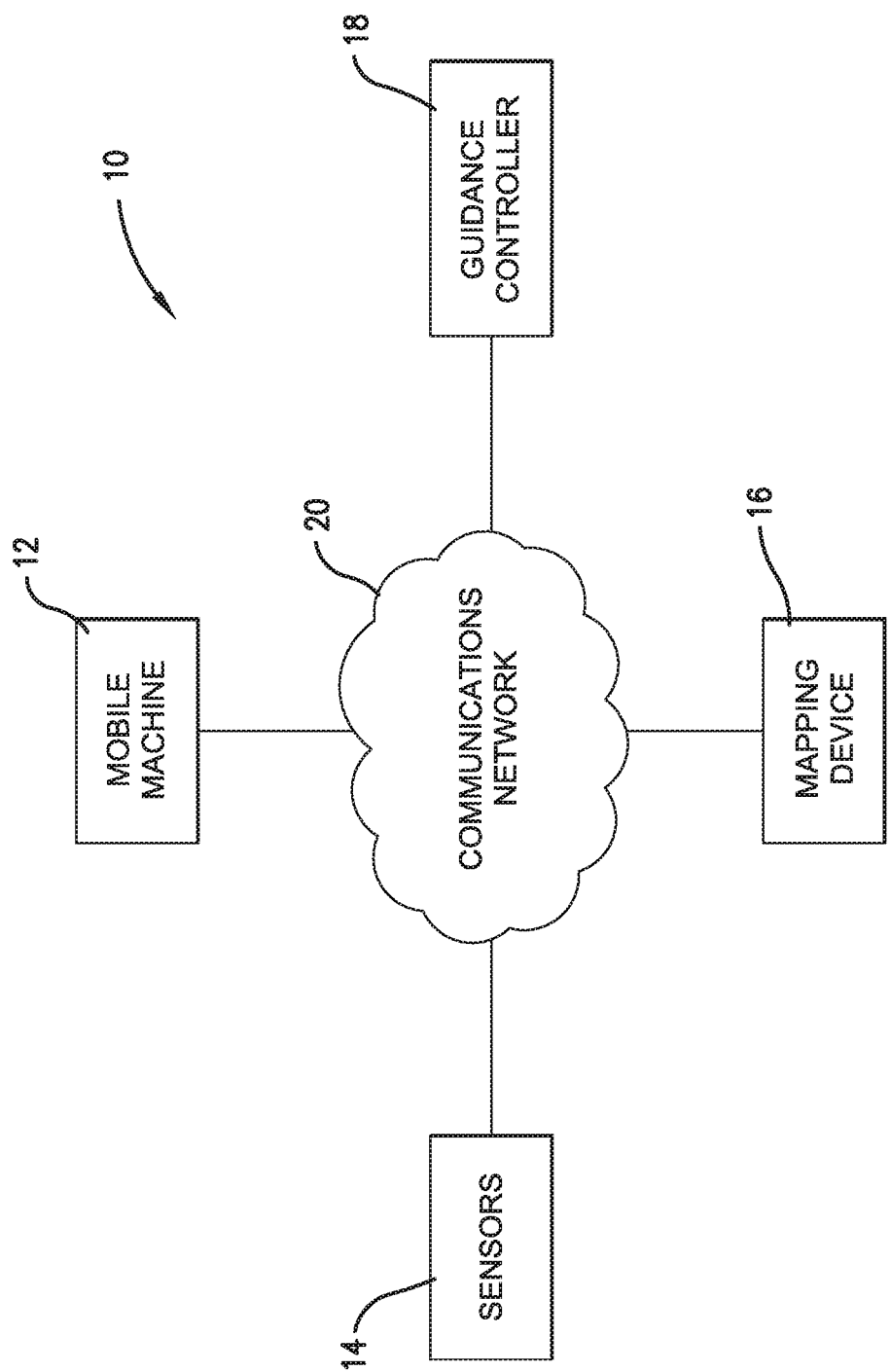
FIG. 1 is a schematic illustration of a mapping and guidance system according to embodiments of the present invention.

Embodiments of the present invention relate to, inter alia, systems and methods for land mapping and machine guidance. Referring to the drawings, a system 10 for mapping and guidance is illustrated schematically in FIG. 1. The mapping and guidance system 10 may broadly comprise one or more mobile machines 12, one or more sensors 14, a mapping device 16, a guidance controller 18, and a communications network 20. The system 10, as such, may be used to capture, via the sensors 14, data associated with a land area. Based on such captured data, the system 10 may generate, via the mapping device 16, two-dimensional or three-dimensional land maps representative of the land area. As will be described in more detail below, such land maps may include routes, waylines, drive paths, pivot paths, or the like. Based on such generated land maps and/or associated routes, waylines, drive paths, or pivot paths, the guidance controller 18 can accurately and efficiently control the operation and/or movement of one or more mobile machines 12 through the land area.

In more detail, the mobile machines 12 of the system 10 may comprise any type of machine or equipment that can traverse through a land area, such as a crop field. With respect agriculture-type machines, such mobile machines 12 may comprise tractors, applicators, harvesters, or the like. Such tractors, applicators, harvesters are generally large, heavy equipment machines. In some additional embodiments, certain mobile machines 12 may also include center pivot irrigation systems, as will be discussed in more detail below. Furthermore, in some embodiments, the mobile machines 12 may be manually-operated or controlled, such as by a human user. Alternatively, in some embodiments, the mobile machines 12 may comprise autonomous vehicles. Such autonomous mobile machines 12 may be autonomously controlled by components of the system 10, such as by the guidance controller 18. In some embodiments, the autonomous mobile machines 12 may comprise autonomously-operated tractors, applicators, harvesters, or the like. In further alternative embodiments, the autonomously mobile machines 12 may comprise relatively small robotic machines, such as ground-based robots (e.g., wheeled or tracked), aerial robots, nautical robots or the like.

The sensors 14 of the system 10 may comprise generally any type of sensor capable of capturing, measuring, and/or sensing data associated with the environment of the land area (referred to herein at times as "field data"). In some embodiments, the sensors 14 may be independent components of the system 10. In other embodiments, the sensors 14 may be associated with and/or incorporated within the mobile machines 12. As such, the sensors 14 may be capable of capturing field data associated with land area and/or data associated with the mobile machines 12. In more detail, the sensors 14 may, in some embodiments, comprise position determining devices in the form of global navigation satellite system (GNSS) receivers. Such position determining devices may be configured to receive signals from one or more positioning systems such as the United States' global positioning system (GPS) and/or the Russian GLONASS system, and to determine a location of the sensors 14 (and/or the mobile machines 12 with which the sensors 14 are associated) using the received signals. As such, the sensors 14 may be configured to measure three-dimensional positions (i.e., a Cartesian X, Y, and Z-coordinates) of the locations of the sensors 14. In other embodiments, the sensors 14 may also comprise other types of sensors capable of obtaining other field data relevant to the environment of a land area, such as a camera for obtaining images/videos of the land area so as to obtain information regarding features and/or obstacles of the land area (e.g., trees, ponds, etc.). The camera may also be used to capture information related to crops growing on the land area, such as plant size, leaf color, the existence of weeds, or the like. Other embodiments of sensors 14 may be used to measure the humidity (e.g., a humidity sensor), the temperature (e.g., a temperature sensor), the granularity, the density, the compaction, the soil type, the organic matter type, or other soil conditions of the land area. Still other sensors 14 may be used to measure the nutrition, the fertility, the nitrogen content (e.g., a nitrogen sensor), the phosphorus content (e.g., a phosphorus sensor), the potassium content (e.g., a potassium sensor), the pH value (e.g., a pH sensor), the amount and type of pesticides, the amount and type of fertilizer, and/or other soil compositions.

The mapping device 16 of the system 10 may comprise generally any type of computing device with one or more processing elements and one or more memory elements. The processing elements may comprise microprocessors, microcontrollers, field programmable gate arrays, and the like, or combinations thereof. In some embodiments, the processors may comprise one or more single-core, dual-core, or quad-core processors configured for simultaneously processing various types of information and/or for executing a plurality of different computer programs or software applications. As such, the processors of the mapping device 16 may be configured to implement operating systems, and may generally be capable of executing computer programs, which are also commonly known as instructions, commands, software code, executables, applications, apps, and the like, which may all be stored on the memory elements of the mapping device 16. The memory elements may be capable of storing or retaining computer programs, and may also store data, typically binary data, including text, databases, graphics, audio, video, combinations thereof, and the like. The memory elements may also be known as a "non-transitory computer-readable storage medium" and may include random access memory (RAM), read only memory (ROM), flash drive memory, floppy disks, hard disk drives, memory cards, optical storage media such as compact discs (CDs or CDROMs), digital video disc (DVD), Blu-ray™, and the like, or combinations thereof. Various actions, functions, calculations, steps, and/or features described herein may be performed by the system 10 may actually be performed via the one or more processors executing a computer program stored on the memory elements. The mapping device 16 may be configured to receive the data captured by the sensors 14 and, based on such data, generate various types of maps. For example, in embodiments in which the sensors 14 capture position data (e.g., X, Y, and Z-coordinates) from a land area, the mapping device 16 may generate, based on such position data, a two-dimensional and/or three-dimensional land map representative of the land area. In some embodiments, the mapping device 16 may also generate routes, waylines, drive paths, pivot paths, or the like, onto the land maps, such as may be used for guidance of mobile machines 12. The mapping device 16 may also be configured to change one or more settings associated with the sensors 14, such as range or resolution. Furthermore, the mapping device 16 may be configured to enable the sensors 14 (or related computing devices) to process data collected by the sensors. By way of example, the mapping device 16 may be configured to provide sample data enabling the sensors 14 (or related computing devices) to distinguish between a crop plant and a weed. Enabling the sensors 14 (or related computing devices) to process collected data may have the advantage of reducing the amount of data transferred over the communications network 20 and/or increase the speed of the system.

The guidance controller 18 of the system 10 may comprise one or more control elements and/or one or more actuators configured to implement guidance and control functionality of the mobile machines 12. As such, the guidance controller 18 may be able to control one or more of the mobile machines 12 based, in part, on information provided by the mapping device 16. For example, the guidance controller 18 may instruct a mobile machine to follow a wayline through a land area, with the wayline based on a land map generated by the mapping device 16. The guidance controller 18 may also be conifigured to adapt a wayline generated by the mapping device 16. This may include omitting sharp edges in a wayline by rounding the corners of the wayline (that is, applying a minimum radius to each turn of the wayline) so that vehicles unable to perform zero-radius turns (sometimes referred to as "Ackermann steering") can follow the waylines. Other constraints, such as accuracy, may require a wayline to be adapted by the guidance controller 18.

The control elements of the guidance controller 18 may be comprised of one or more processing elements configured to execute a computer program stored on one or more memory elements of the guidance controller 18. By way of example the control elements may comprise a digital controller and may include one or more general purpose microprocessors or microcontrollers, programmable logic devices, or application specific integrated circuits. In some embodiments, the control elements may include multiple computing components placed in various different locations on the mobile machine 12. The control elements may also include one or more discrete and/or analog circuit components operating in conjunction with the one or more integrated circuits or computing components. Furthermore, the controller elements may include or have access to one or more memory elements operable to store executable instructions, data, or both.

The actuators of the guidance controller 18 comprise any type of mechanism capable of operating or driving certain functions of the mobile machines 12 including, for example, steering and/or acceleration when an automated guidance function is engaged. The actuators may take virtually any form but are generally configured to receive control signals or instructions from the controller elements (or other component of the guidance controller 18) and to generate a mechanical movement or action in response to the control signals or instructions. By way of example, the actuators, which may be used in conjunction with sensors/encoders, may be used in automated steering (or other automated operation) of the mobile machines 12 wherein the sensors/encoders detect a current position or state of steered wheels or tracks and the actuators drive steering action or operation of the wheels or tracks.

Finally, the communications network 20 may comprise generally any type of wired or wireless communications networks (or combinations thereof) capable of providing for connection and communication between the components of the system 10. The communications network 20 may include cellular networks (e.g., 2G, 3G, or 4G), IEEE 802.11 standard such as WiFi, IEEE 802.16 standard such as WiMAX, Bluetooth™, Internet or Cloud-based networks, or combinations thereof. Alternatively, or in conjunction, the communications network may use wired protocols, such as serial communication protocols, universal serial bus protocols, fiber optic protocols, CAN-Bus (Controller Area Network) protocols (used for vehicles) or the like or combinations thereof. The communications network 20 may facilitate communications between various components of the system 10, such as between the mobile machines 12, the sensors 14, the mapping device 16, and/or the guidance controller 18. As such, the components of the system 10 may include transceivers or other communications elements that are configured to communicate with other elements, devices, systems, and/or networks. For example, such communication elements may include signal or data transmitting and receiving circuits, such as antennas, transceivers, amplifiers, filters, mixers, oscillators, digital signal processors (DSPs), and the like. The communication elements may also establish communication wirelessly by utilizing RF signals and/or data that comply with required communication standards. Alternatively, or in addition, the communication elements may establish communication through connectors or couplers that receive metal conductor wires or cables which are compatible with networking technologies such as ethernet.

Center Pivot Mapping

Given the mapping and guidance system 10 described above, embodiments of the present invention may be used to generate a land map of a land area, such as a crop field, and to determine optimal routes, paths, or waylines through the land area. Such a land map may be a two-dimensional representation of the field. Embodiments may provide for routes, paths, or waylines to be generated on the two-dimensional land map, with such routes, paths, or waylines being indicative of intended courses by which mobile machines 12 should traverse through the field. However, embodiments of the present invention provide for the positions of such routes, paths, or waylines to be adjusted on the two-dimensional land map so as to compensate for the terrain of the field. To accomplish such, as discussed in more detail below, embodiments provide for a height profile of the field to be generated, and based on such height profile, the positions of the routes, paths, or waylines on the two-dimensional land map can be compensated and/or adjusted (i.e., "terrain adjusted").

Figure 2:
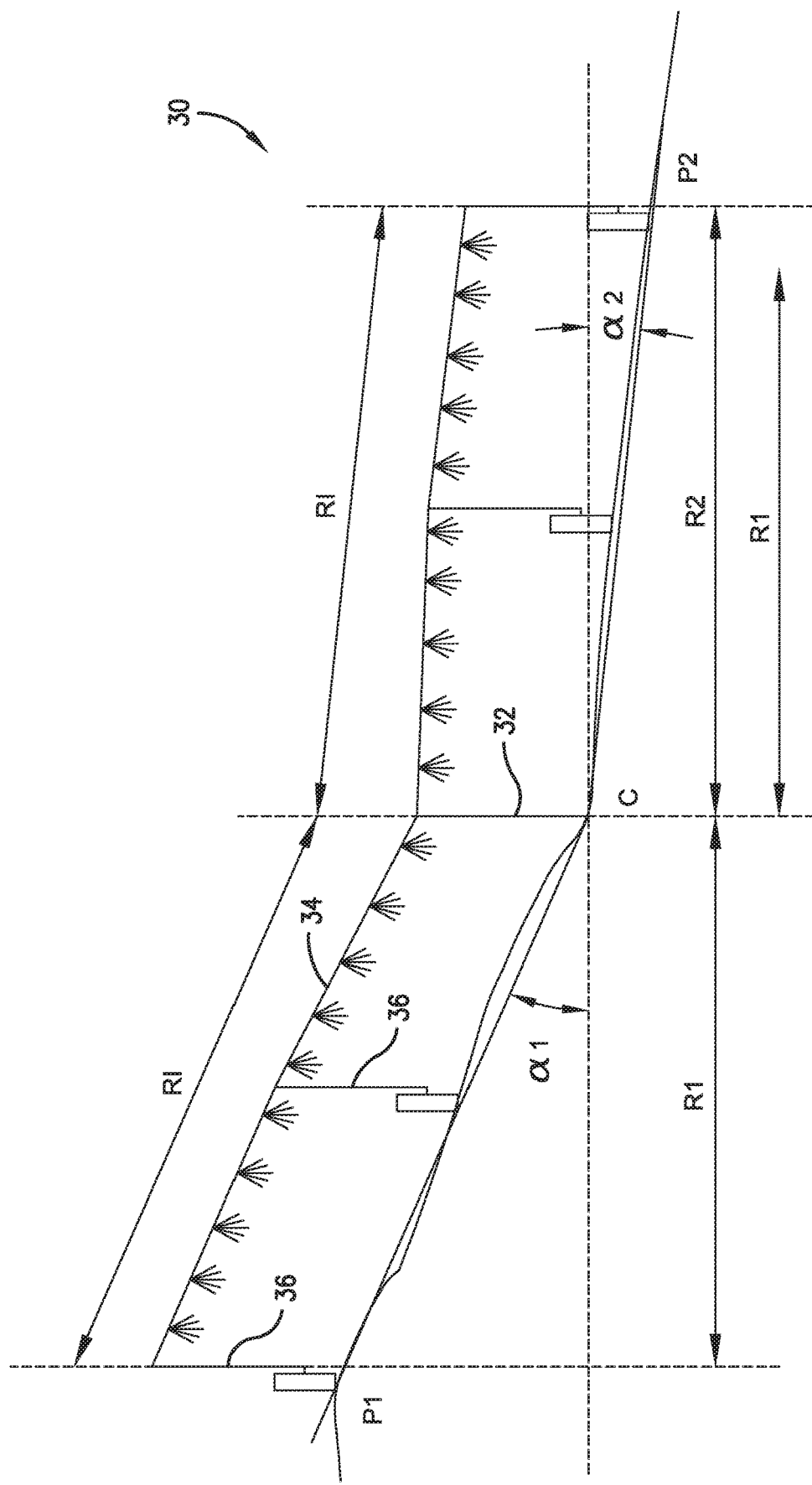
FIG. 2 is a depiction of a mobile machine in the form of a center pivot system being used to irrigate sloped portions of a field.

In more detail, many fields used to grow crops are irrigated by a circular irrigation system, such as a center pivot system. An exemplary center pivot system 30 is illustrated in FIG. 2. It should be understood that the center pivot system 30 may be an embodiment of a mobile machine 12 from the terrain mapping and guidance system 10. Thus, the center pivot system 30 may be associated with one or more sensors 14, such that the center pivot system 30 can collect field data, via the sensors 14, as the center pivot system 30 traverses the field. In other embodiments, the center pivot system 30, as a mobile machine 12, can have its movement through the field controlled by the guidance controller 18.

As shown in FIG. 2, the center pivot system 30 may comprise a central pivot member 32 that is securely positioned within a field. In certain instance, the center pivot member 32 may be positioned near a center of the field so as to maximize the reach of the center pivot system 30. The center pivot system 30 further includes a pivot arm 34 that extends from the center pivot member 32 about a radius RI. The center pivot member 32 is configured to rotate or pivot around the field with respect to an axis defined by the center pivot member 32. The pivot arm 34 may be supported by a plurality of wheeled supports 36, which support the pivot arm 34 above the ground and facilitate movement of the pivot arm. Certain embodiments of center pivot systems 30 may include electric motors (and/or hydraulic or water-powered motors) at each wheeled support 36 to provide power to the wheels. The pivot arm 34 generally includes a plurality of spray nozzles from which water (and/or fertilizer or pesticides) may be applied to the field as the pivot arm 34 rotates.

For a generally flat and level field, such a center pivot system 30 will rotate around about a generally circular area of the field. As such, guidance and control of a center pivot system 30 through such a flat and level field can be relatively straightforward. However, if the field is sloped, undulated, or otherwise irregularly shaped, guidance and control of a center pivot system 30 can be more difficult. Specifically, generating accurate and efficient paths for the center pivot system 30 to travel (i.e., pivot paths) can be complex for sloped or irregularly-shaped fields. To illustrate an irregularly-shaped field, FIG. 2 shows the center pivot system 30 being operated on an uneven field. FIG. 2 illustrates the center pivot system 30 in two positions. A first position shows the pivot arm 34 extending leftward (as being viewed in FIG. 2) from the center pivot 32 up a slope. As illustrated, the actual extension of the pivot arm 34 leftward is its radius RI. However, a projection of the pivot arm's 34 extension onto a flat, two-dimensional reference plane is illustrated in FIG. 2 as R1. A second position shows the pivot arm 34 extending rightward (as being viewed in FIG. 2) from the center pivot 32 down a slope. As illustrated, the actual extension of the pivot arm 34 rightward is its radius RI. However, a projection of the pivot arm's 34 extension onto the flat, two-dimensional reference plane is illustrated in FIG. 2 as R2. Comparing R1 and R2, it becomes apparent that a two-dimensional representation of the extensions of the center pivot system 32 (i.e., similar to an overhead plan view of the field and center pivot system 30) can lead to inconsistencies and/or inaccuracies of the center pivot system 30 pathing as the two-dimensional representations of the pivot arm's 34 extension (i.e., R1 and R2) are different from each other and from the actual radius (i.e., RI). Nevertheless, embodiments of the present invention enable the creation of accurate and efficient pathing for the center pivot system 30 through such an uneven field by obtaining a height profile for the field and for generating a two-dimensional land map of the field, with such land map include pathing that is terrain adjusted to account for the particular surface contours of the field.

Figure 3:
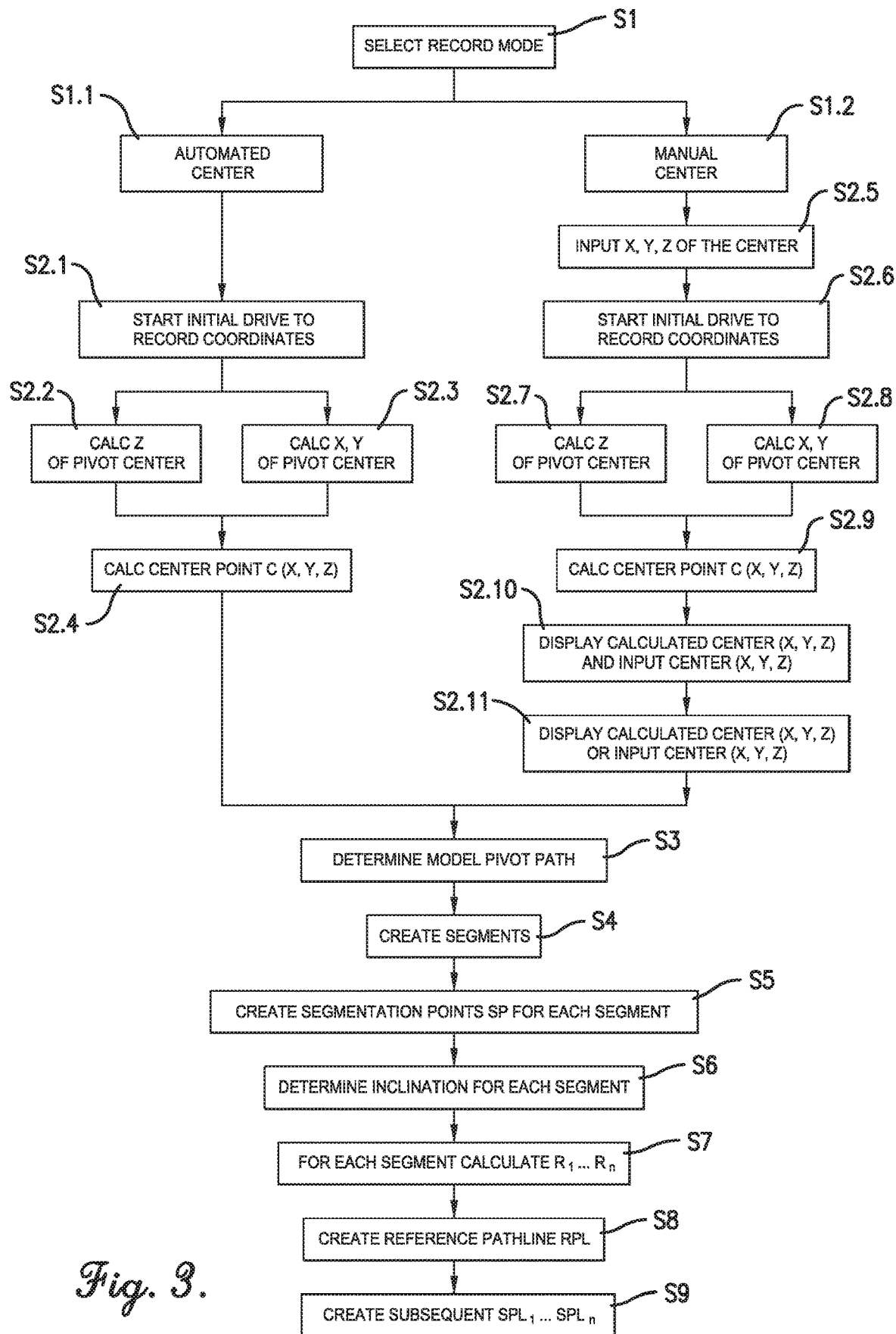
FIG. 3 is a flow chart of a method for generating a land map according to embodiments of the present invention.

In more detail, certain embodiments of the present invention are configured to determine accurate and efficient routes, paths, or waylines through a sloped, undulating, or otherwise irregularly-shaped field by: (1) obtaining position data (e.g., X, Y, and Z-coordinates) for a model path on the field, with such model path, for example, being associated with an outermost path traversed by the center pivot system 30 (2) segmenting the model path with regard to a center point, with such center point, for example, being defined by the center pivot 32 of the center pivot system 30, (3) generating height and angle profile data for each segment of the model path, with such height and angle profile data being based on the obtained position data and on the center point, (4) creating one or more terrain-adjusted paths using the height and angle profile data for each segment of the model path, and (4) generating a two-dimensional field map, which includes such terrain-adjusted paths formed thereon. The above-described process is described in more detail in method 40, which is illustrated in FIG. 3. It should be understood that certain embodiments of method 40 may not require that each step of the method be performed, while some embodiments may provide for the inclusion of additional steps. Also, the steps of the method 40 may be performed in an order different from that that illustrated and described herein.

To begin, position data of the field should be obtained. In some embodiments, such position data may be readily available from existing resources, such as topographical data provided by a surveyor or public authority. However, if such data is not available the system 10 may be used to generate the needed position data. Specifically, one or more of the sensors 14, such as in the form of the position determining devices, may be carried through the field so as to capture position data for various locations within the field. In some embodiments, the sensors 14 may be carried by a mobile machine 12, such as a either manually-operated or a autonomously-operated vehicle. In some embodiments, the captured position data may be transmitted over the communications network 20 to the mapping device 16, such that the mapping device can perform the required steps to generate the height and angle profile data for the field and/or to create the resulting two-dimensional land map. In some embodiments, the mapping device 20 may be included within and/or otherwise associated with the mobile machine 12. Alternatively, the mapping device 16 may be positioned separately from the field, such as in a building or worksite situated adjacent to the field. In even further alternatives, the mapping device 16 may be associated with an Internet or cloud-based system that operates remotely from the field.

With continued reference to the method 40 illustrated in FIG. 3, an initial Step S1 includes the beginning of recording position data for the field. As noted above, such position data may be captured by a mobile machine 12 traversing the field with a sensor 14, in the form of a position determining device. In some embodiments, a user of the system 10 can select to record the position data in either an "Automated Center" mode or a "Manual Center" mode. In the Automated Center mode (See Step S1.1), position data is captured by the mobile machine 12 as the mobile machine 12 traverses the field. As will be described in more detail below, the route may be in the form of a closed curve. Based on the position data of the route, embodiments provide for a center point of the route to be automatically determined. In some embodiments, the route driven by the mobile machine 12 will be a generally circular route extending around a boundary of the field. As such, the center point may also correspond with a center of the field. As an alternative to the Automated Center mode, certain embodiments may also provide for the Manual Center mode (See Step S1.2), in which the user of the system 10 can enter manually enter position data (e.g., X, Y, Z-coordinates) for the center point prior to the of the mobile machine 12 traversing its route through the field.

When in the Automated Center mode, step S2.1 provides for the mobile machine 12 (with its associated sensor 14) to be driven along a route through the field. In general, the route may be defined by the rotation of the pivot arm 34 center pivot system 30. Specifically, the route may correspond with the outermost wheeled support 36 of the center pivot system 30. As such, the mobile machine 12 may follow visible tracks made by the wheels of the wheeled support 36 of the center pivot system 30. In addition to the mobile machine 12 being manually operated (i.e., driven by a user), certain embodiments may provide for the use of autonomously-operated mobile machines 12. Such autonomous mobile machines 12 may be provided with sensors 14 in the form of a camera-based image recognition system, which is capable of detecting the tracks or footprint of the center pivot system 30 and controlling the autonomous mobile machines 12, e.g., via the guidance controller 18, to automatically follow such track or footprint. Regardless, during such drive along the route, the sensor 14 associated with the mobile machine 12 may capture position data for various locations along the route. Such position data may be in the form of GPS coordinate system based on latitude, longitude and altitude, or alternatively may be captured as Cartesian coordinates. If captured as GPS coordinates, such position data may be transmitted to the mapping device 16 (e.g., via the communications network 20), where the positional data can be converted to Cartesian coordinates and recorded.

Figure 4:
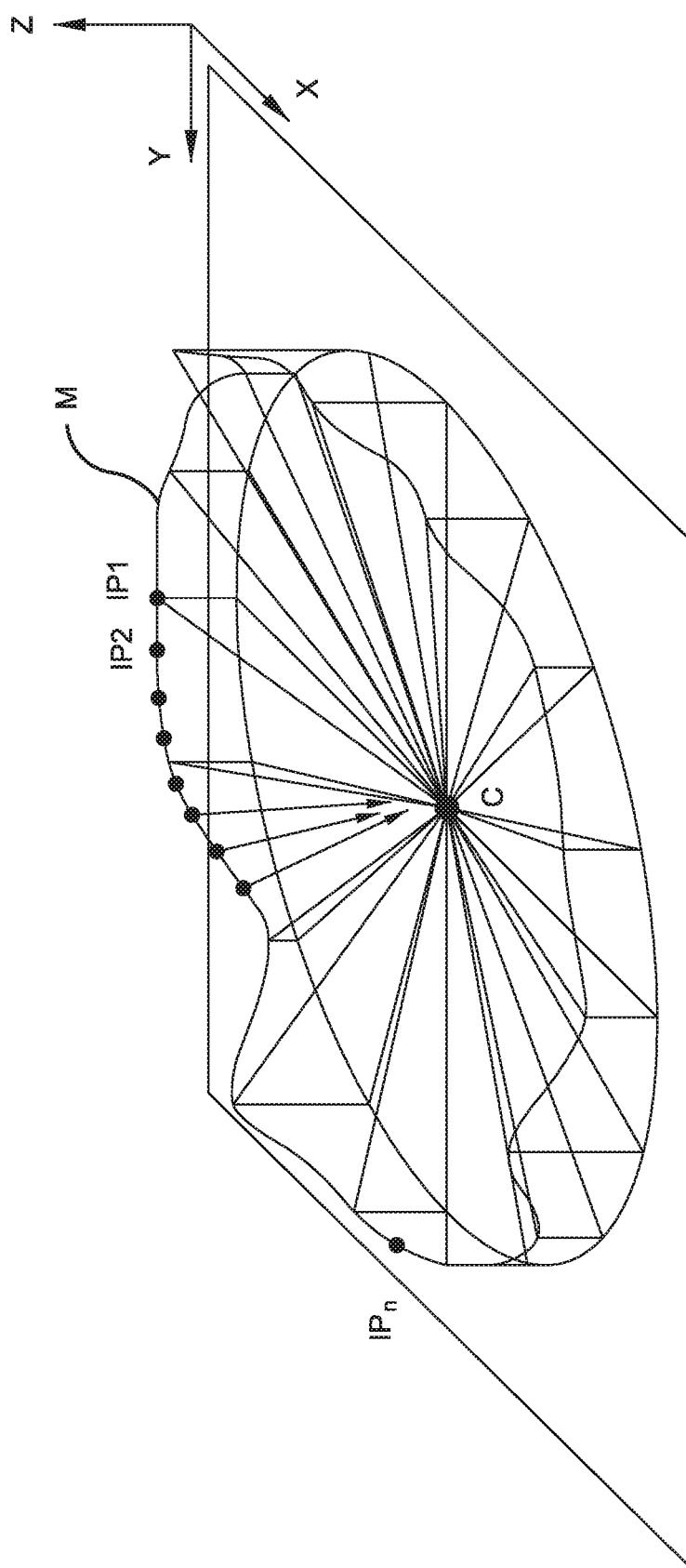
FIG. 4 is a graphic depiction of a three-dimensional model pivot path for a field generated using position data obtained for a plurality of locations on the field, with the model pivot path enclosing a center point.

As the mobile machine 12 drives along the route, embodiments provide for a scatter plot of initial points IP1, IP2 . . . IPn to generated, with such a scatter plot including coordinates for each respective point, e.g., IP1(X1, Y1, Z1), IP2(X2, Y2, Z2) . . . IPn(Xn, Yn, Zn), as is illustrated in FIG. 4. As noted above, certain of the functions, processes, and/or steps described herein may be performed by the mapping device 16 of the system 10. Other functions, processes, and/or steps may be performed other components of the system 10 or by a combination of components. Regardless, as illustrated in Step S2.2, embodiments of the present invention may automatically determine coordinates of a center point C of the field based on the coordinates collected for the points IP1, IP2 . . . IPn. In more detail, embodiments may continuously calculate an average height coordinate Za of the center point C, based on the Z-coordinate of each point IP1, IP2 . . . IPn. Such averaging requires at least two points to be recorded; however, it should be understood that the more points that are considered, the more accurate the average height coordinate Za. At the end of the initial drive, which may form a closed loop around center point C, a Z-coordinate of the center point C may be determined as the average height coordinate Za of all measured Z-coordinates for points IP1, IP2 . . . IPn.

As illustrated in FIG. 3, a parallel Step 2.3 may be initiated after the positions of a predetermined number of points (e.g., after 3 points) have been recorded. Embodiments may use the X and Y coordinates of three points IP(n−1), IP(n) and IP(n+1) to determine estimated X and Y coordinate of the center point C and, as well as a radius corresponding to a distance between center point C and the point IPn. Embodiments of the present invention may use various method for determining such information, as there are several, well-known methods and algorithms for determining the location of a center of a circle and the circle's radius from multiple known points on the circle. For instance, such methods may include the Gauss-Newton algorithm, the Gauss-Helmert algorithm, and/or the Levenberg-Marquardt algorithm. As with the determination of the Z coordinate of the center point C, the generated X and Y coordinates of the center point C can be more accurately defined using a larger number of points IPn.

During the initial drive of the mobile machine 12 along the route, embodiments may provide for the user operating the mobile machine 12 to be provided with a status, which is indicative of a quality of the drive. An example of such a status is illustrated by the status bar 42 shown in FIG. 5. The status bar 42 may be graphic depiction displayed on an electronics display associated with the mobile machine 12, the mapping device 16, and/or some other component of the system 10. The status bar 42 may be illustrative of a quality metric for the drive along the route. For instance, the quality metric may include a Root Means Square (RMS) difference between the distance driven by the mobile machine 12 and a circumference of a calculated and/or an ideal pivot path. In some embodiments, the circumference of the calculated and/or ideal pivot path may be calculated as a percentage of the respective radius of the calculated and ideal pivot path. As used herein, the "ideal" pivot path is used to mean a pivot path that was previously calculated based on previous drives of the mobile machine 12 along the route. The status bar 42 may use colors to illustrate to the user a quality of the current drive: high quality (area 42a, which may be colored green on a user interface), good quality (area 42b, which may be colored yellow on a user interface), medium quality (area 42c, which may be colored red on a user interface), or poor quality (area 42d, which may be colored black on a user interface). The status bar 42 may include a pivot slider 44, which illustrates during the drive how the currently-calculated circumference deviates from previous circumferences based on previous driving along the route. At the beginning of a drive, with only a small number of points being used to calculate, the pivot slider 44 may be in the area of BLACK or RED while the quality is increased with the pivot driven. As such, at the end of a drive, the pivot slider 44 should, ideally, be in the green area.

Returning to FIG. 3, in step S2.4, the Z-coordinate of center point C and the X and Y-Coordinates of center point C, each of which were determined in previous steps, may be merged to provide X, Y, and Z-Coordinates of the center point C. Such merged X, Y, and Z-Coordinates may, as described in more detail below, be used in subsequent steps of the method 40. As such, the X, Y, and Z-Coordinates of the center point C and the points IP1, IP2 . . . IPn of the route can be stored, such as in the memory element of the mapping device 16, for further use. In some embodiments, the status bar 42 and/or the pivot slider 44 may also be used to indicate a quality of the position of the center point C (as calculated based on the position data collected along the route) in comparison to positions of the center point C previously calculated. Such quality indication may be provided throughout the drive so as to provide an indication of the quality of the drive currently being executed.

In addition to automatically calculating the position of the center point C, as was described above with reference to steps S1.1 through S2.4 of method 40, alternate embodiments of the present invention, as shown in step S1.2, provide for the position of the center point C to be manually entered. Specifically, with reference to step 2.5, a user can manually enter the position (e.g., the Cartesian coordinates) of the center point C in various manners. For instance, the position of the center point C, including one or all of the X, Y, or Z-coordinates, may already be known (e.g., as manually acquired from a topographical survey), such that the position data can be manually entered into the mapping device 16. Alternatively, the mobile machine 12 (with its associate sensors 14) may be driven to a location adjacent to the center pivot 32 of the center pivot system 30 so as to measure the position of the center point C. In some embodiments, the user may enter a manual correction to move the measured position of the center point C closer to the actual position of the center pivot 32. As an even further alternative, a user may manually hold a sensor 14 while standing next to the center pivot 32 to capture the position of the center point C. It should be understood that these above-described examples of manually determining and entering the position of the center point C may be necessary for fields with a conic surface or a sink where the step S2.1 of the Automated Center mode may determine an inaccurate height for the center point C.

After manually inputting the position of the center point C, the mobile machine 12 can be driven around the previously-described route to capture the position data for various locations along the route, as illustrated in steps S2.6-2.9. Such steps S2.6-S2.9 are generally the same as those described in steps S2.1 to S2.4. As the position data is being captured, the user may be presented with a status bar 42, as illustrated in FIG. 6, which shows the quality of the drive and the positions being captured. The status bar 42 of FIG. 6 is similar to that of FIG. 5, but also includes a center-point slider 46, shown at the top of the status bar 42. This center-point slider 46 may be used to illustrate during driving, how an automatically-calculated center point C position (as calculated based on the positions of the points captured during the drive of the mobile machine 12 along the route) deviates from the manually-entered position of the center point C. The center-point slider 46 may use the green/yellow/red/black colors, as described above, to the quality of the position of the center point C. The user can evaluate any differences between the two values, such that the user can decide in step S2.11, which center point C value to use (either the automatically-calculated center point C or the manually-entered center point C). If the center-point slider 46 shows that automatically-calculated center point C is of a higher quality than the manually-entered center point C (as indicated, for example, by the position of the slider 46 in the green, yellow, red or black portions of the status bar 42), the user can react and manually re-enter and/or adjust the position of the center point C. As such, common errors, such as an incorrect plus/minus sign, decimal place, or a number ordering error can be efficiently corrected. The user can, thus, correct such errors and can directly see the effects of such correction by way of the center-point slider 46, without having to recollect previously-obtained or previously-entered data. Such embodiments may save the user from the time and expense of unneeded circumnavigation of the (potentially large) field in the case of a data-entry error.

As an alternative to the above, certain embodiments may provide for step S2.5 to be omitted, and the user may simply manually enter a position for the center point C after step S2.9. However, such embodiments may result in the status bar 42 not including the center-point slider 46 for purposes of comparing values for the center point C positions.

Turning now to steps S3-S.9, it should be understood that such steps can be performed in a similar manner regardless of whether steps S1.1-S2.4 (i.e., Automated Center mode) or steps S1.2-S2.11 (i.e., Manual Center mode) were initially used. In step S3 a model pivot path can be generated. The model pivot path M, illustrated by the outer closed curve in FIG. 4, may be generated as a three-dimensional curve that extends through and connects each of the previously determined points IP1(X1, Y1, Z1), IP2(X2, Y2, Z2) . . . IPn(Xn, Yn, Zn), as obtained during the mobile machine's 12 drive along the route. In some embodiments, interpolation may be used to connect the points IP1 . . . IPn so as to define the curved path corresponding to the model pivot path M. As will be described in more detail below, the positions of certain points along the model pivot path M, as well as the position of the center point C, may be used to generate the height and angle profile data and, thus, the two-dimensional land map for the field, which may include terrain-adjusted routes, paths, and/or waylines formed thereon.

Turning to step S4 of method 40, as illustrated in FIG. 3, step S4 provides for the generation of segmentations of the model pivot path M. As shown in FIG. 7, such segmentations may be based on a vertically-oriented datum plane, DP. The datum plane DP may be initially oriented through the center point C, aligned with the Z-axis, and extending along a North-South orientation. However, it should be understood that the datum plane DP may be configured in other orientations. Segment datum planes SDP1 . . . SDPn may then be created by rotating the datum plane DP about the Z-axis through a segmentation angle β as illustrated in FIG. 7. The segmentation angle β may be determined based on the number of increments included in the segmentation of the model pivot path M. If the number of increments of the segmentation is 32, for example, the segmentation angle β may equal 11.25°=360°/32. Fewer increments are shown in the present figures to assist with clarity and interpretation.

In Step S5 of method 40, the points at which the model pivot path M intersects with each segment datum planes SDP1 . . . SDPn may be determined. It should be understood that the initial points IP1, IP2 . . . IPn of the model pivot path M may not correspond to the intersections with any of the segment datum plane SDP1 . . . SDPn. As such, finding the intersection of the model pivot path M and the segment datum planes SDP1 . . . SDPn may be generated based on estimates of where the segment datum planes SDP1 . . . SDPn intersect with the model pivot path M. The point where a segment datum plane SDPn intersects with the model pivot path M is referred to herein as segmentation point SPn and is illustrated in FIG. 7.

In some alternative embodiments, the number of segment datum planes SDP1 . . . SDPn may be determined based on the number of points IP1, IP2 . . . IPn included in the model pivot path M. As there may be a high number of such points IP1, IP2 . . . IPn, a selection around the model pivot path M may be taken so that the increment of segment datum planes SDP1 . . . SDPn does not depend on a segmentation angle β but, rather, on the number of points IP1, IP2 . . . IPn on the model pivot path M. As such, a particular segment datum plane SDPn may be generated between each 5, 10, 25, 50, 100, or 500 of points IP1, IP2 . . . IPn. FIG. 8 illustrates an example whereby a segmentation point SP (and thus a segment datum plane SDP) is positioned at an increment of every 10 points IP1, IP2 . . . IPn. As such, with respect to FIG. 8, segmentation points SP1, SP2 . . . SP5 are located, respectively, at points IP1, IP10 . . . IP50 of the model pivot path M.

Some additional embodiments provide for the increment to be variable. For example, if the model pivot path M includes significant height differences between points IP1, IP2 . . . IPn (i.e., indicative of a steep surface slope), the increment distance between segmentation points SP (and thus segment datum planes SDP) may be decreased to provide higher accuracy of calculations for subsequent steps. FIG. 9 illustrates an example provided with a variable increment. Initially the segmentation points SP1 to SP2 are located at an increment of every 10 points, i.e., IP1 . . . IP10. However, as the model pivot path M begins to show significant inclination, the increment distance between segmentation points SP may be reduced. For instance, the increment distance between segmentation points SP3 to SP6 is every 5 points, i.e., IP10, IP15 . . . IP30. In further embodiments, the placement of the segmentation points SP (and thus segment datum planes SDP) may be determined using a change of slope (i.e., a double derivative) of the model pivot path M using the height values (i.e., Z-coordinates) of the points IP1, IP2 . . . IPn. As such, the position and number of segment datum planes SDP may be determined at a higher frequency (smaller increments) to describe areas which require a higher segment density to be adequately described and reducing the number of superfluous segments. To determine the required segment density, adaptations of the Ramer-Douglas-Peucker algorithm (or other similar algorithms) may be used. Given an original curve comprised of line segments connecting a plurality of points, the Ramer-Douglas-Peucker can be used to find a similar curve with fewer points, with such determination based on the maximum distance between the original curve and the simplified curve (e.g., a Hausdorff distance between the curves). Such a simplified curve may consist of a subset of the points that defined the original curve.

Upon determining the number of segments for the model pivot path M, the position (e.g., X, Y, and Z-coordinate) for each segmentation point SP1 . . . SPn may be determined. As indicated above, such positions may be determined based on the intersection of the segmentation datum planes SDPn and the model pivot path M, with the position data for the model pivot path M being captured by the mobile machine 12 during about the pivot path (i.e., from steps S2.1 to S.211) and/or estimated using interpolation. Upon determining the X, Y, and Z-coordinates of segmentation points SP1 . . . SPn, as well as for the center point C, an inclination angle $\alpha 1 \ldots \alpha n$ between the center point C and each segmentation point SP1 . . . SPn can be determined in step S6.

Figure 10:
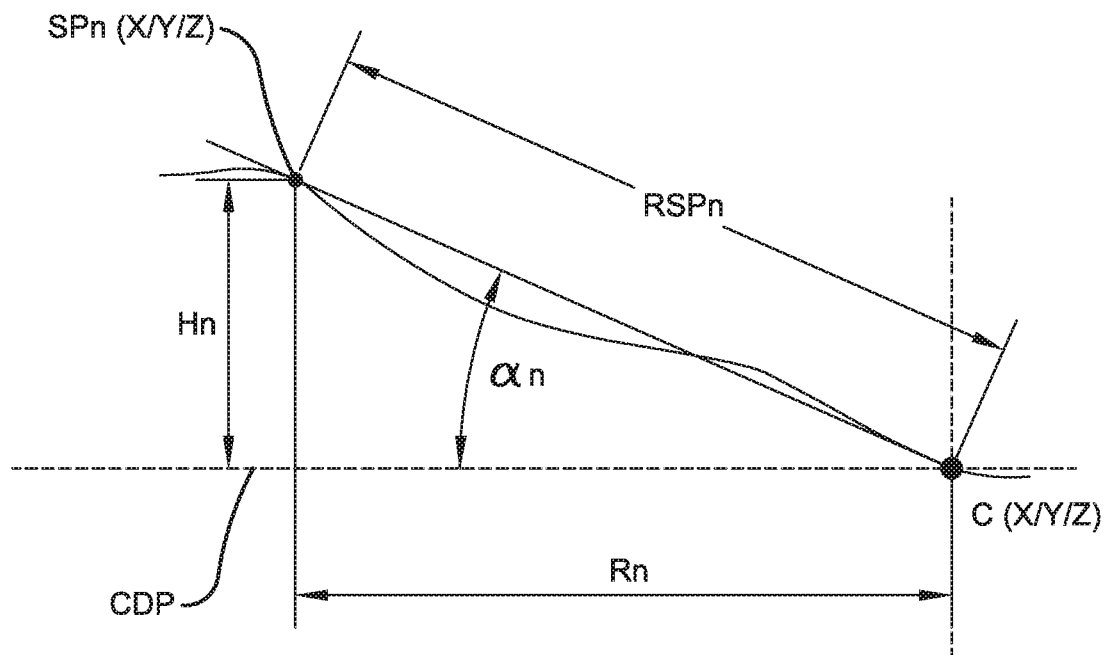
FIG. 10 is a graphic depiction of an inclination of the field from FIG. 4 with respect to a segmentation plane extending through the center point and a segmentation point SPn.

In more detail, and with reference to FIG. 10, a center datum plane CDP may be used as a reference for determining the inclination angle $\alpha 1 \ldots \alpha n$ for each segmentation point SP1 . . . SPn. The center datum plane CDP may be defined to include the center point C and to be tangential to the WGS-84 Ellipsoid, which is a commonly used reference frame for the World Geodetic System standard (as used by the Global Positioning System). Specifically, the WGS-84 Ellipsoid comprises an oblate spheroid or ellipsoid, centered on the Earth's center of mass, having a major (equatorial) radius "a" of 6,378,137 meters at the Earth's equator and a flattening "f" of 1/298.257223563. A polar semi-minor axis "b" of the WGS-84 Ellipsoid equals ax(1−f), or about 6356752.3142 meters. More broadly then, the center datum plane CDP may be considered as a plane that is tangent with the Earth's average surface level.

Thus, assuming that each segmentation point SP1 . . . SPn can be connected to the center point C with a straight line, the inclination angle $\alpha 1 \ldots \alpha n$ can be determined as follows. First, and remaining with FIG. 10, heights H1 . . . Hn for each segmentation point SP1 . . . SPn can be determined based on the differences between the Z-coordinates of each segmentation point SP1 . . . SPn and the center point C. Next, magnitudes or lengths of radial vectors RSP1 . . . RSPn between each segmentation point SP1 . . . SPn and the center point C may be calculated based on the X, Y, and Z-coordinates of the segmentation points SP1 . . . SPn and of the center point C. Both values (i.e., the heights H1 . . . Hn and the magnitudes of radial vectors RSP1 . . . RSPn) can be used to determine an inclination angle $\alpha 1 \ldots \alpha n$ for each segmentation point SP1 . . . SPn using (trigonometric) equations, such as:

$$SIN\ \alpha n = Hn/|RSPn|$$

Based on the height values (e.g., H1 . . . Hn) and inclination angles (e.g., $\alpha 1 \ldots \alpha n$) obtained for a plurality of locations on the field, a height and angle profile of the field is determined. This height and angle profile can be used to generate accurate and efficient pathing through the field, with such pathing being generated on a two-dimensional land map of the field.

As a next step S7 of method 40, each inclination angle $\alpha 1 \ldots \alpha n$ can be used to determine the path radii R1 . . . Rn for each segmentation point SP1 . . . SPn, as illustrated in FIG. 10. In more detail, the path radius Rn corresponds to the distance from the center point C to the model pivot path M (at the location of the segmentation point SPn) as projected onto the center datum plane CDP or another imaginary surface that is flat or nearly flat and intersects the center point C. In other words, the path radii R1 . . . Rn each correspond to the distance from the center point C to the segmentation point SP1 . . . SPn on the model pivot path M if viewed from directly above the field. The path radii R1 . . . Rn may be useful because GPS systems generally treat fields as if the fields are flat and level regardless of the physical terrain included in the field. As such, projecting the model pivot path M onto a two-dimensional reference plane, such as the center datum plane CDP, can permit the system 10 to transform the three-dimensional model pivot path M onto a more efficient two-dimensional reference plane, which may be used as a two-dimensional land map. The following equation may be used to calculate path radii R1 . . . Rn for each segmentation point SP1 . . . SPn:

$$Rn = |RSPn| * COS\ \alpha n$$

Figure 11:
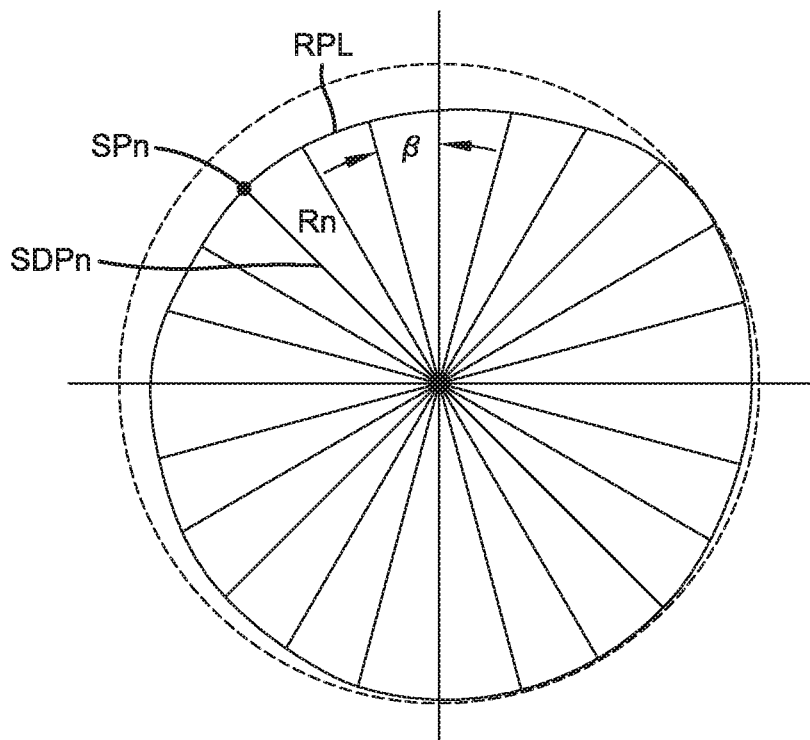
FIG. 11 is an overhead plan view of the field from FIG. 4, illustrative of the model pivot path being projected onto a two-dimensional reference plane.

In step S8 of method 40, a reference path line RPL, as illustrated in FIG. 11 may be created, with such reference path line RPL being used as a basis to determine subsequent pivot paths. The reference path line RPL can be generated by using the path radii R1 . . . Rn. Specifically, the path radii R1 . . . Rn can be used as length vectors which extends from the center point C along the segment planes SDP1 . . . SDPn and end radially outwards of the center point C. The positions corresponding to the ends of the path radii R1 . . . Rn (distal the center point C), thus, lie on the reference path line RPL. Interpolation may be used to define the curved path corresponding to the reference path line RPL. Stated differently, the reference path line RPL represents the three-dimensional model pivot path M projected onto the two-dimensional datum plane CDP, which may be used as a two-dimensional land map.

Figure 12:
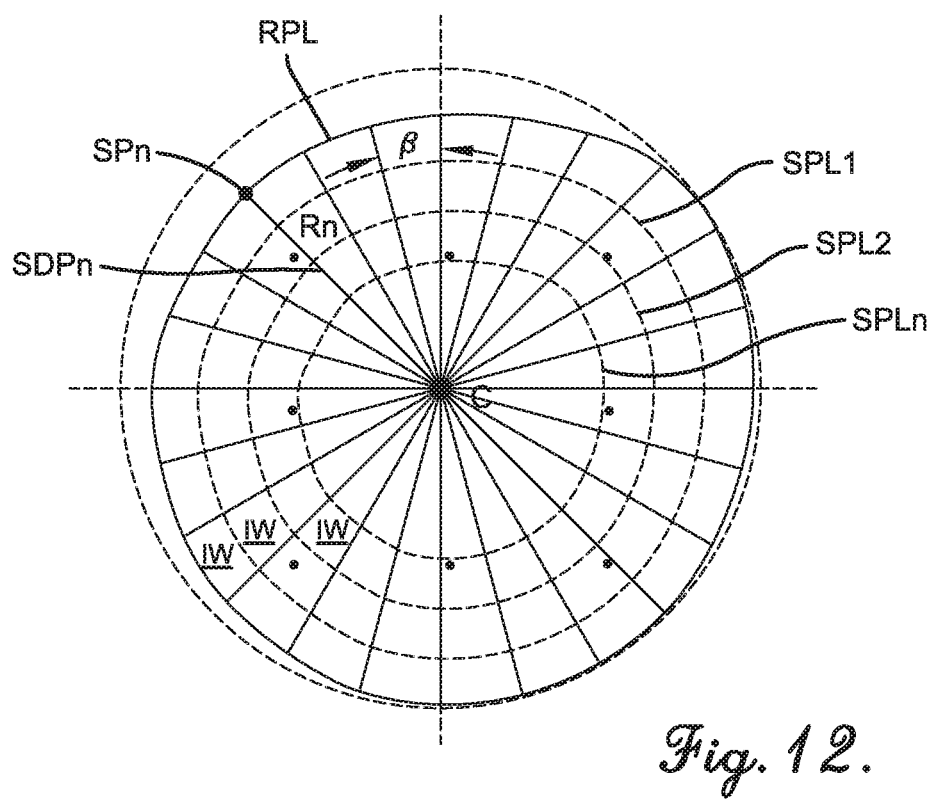
FIG. 12 is an overhead plan view of the field from FIG. 11, further illustrating subsequent path lines formed on the two-dimensional reference plane.

In Step S9 of method 40, embodiments of the present invention can generate subsequent path lines SPL1 . . . SPLn on the two-dimensional datum plane CDP, as illustrated in FIG. 12. The subsequent path lines SPL1 . . . SPLn may be located interior of the reference path line RPL and may be spaced from the reference path line RPL. The spacing from the reference path line RPL may be based on a working width W (See FIG. 13), with each subsequent path line SPL1 . . . SPLn being spaced from the reference path line RPL based on a multiple of the working width W. The subsequent path lines SPL1 . . . SPLn may be used to define pivot paths, waylines, and/or working areas of the field. For example, the subsequent path lines SPL1 . . . SPLn may be used as pivot paths or waylines for the wheeled supports 36 of the center pivot system 30 to follow. Alternatively, the subsequent path lines SPL1 . . . SPLn may be used to define working areas/coverage areas for the spray nozzles of the center pivot system 30 to apply water to the field. However, as indicated above, the subsequent path lines SPL1 . . . SPLn are generated on the two-dimensional reference plane (e.g., the datum plane CDP), which may be used as a two-dimensional land map. As such, to accurately account for the three-dimensional contours or terrain of the field, the positions of the subsequent path lines SPL1 . . . SPLn on the two-dimensional reference plane may need to be terrain-adjusted. Embodiments provide for such adjustments to be made by adjusting the working widths W that separate the subsequent path lines SPL1 . . . SPLn from the reference path line RPL and/or each other.

Figure 13:
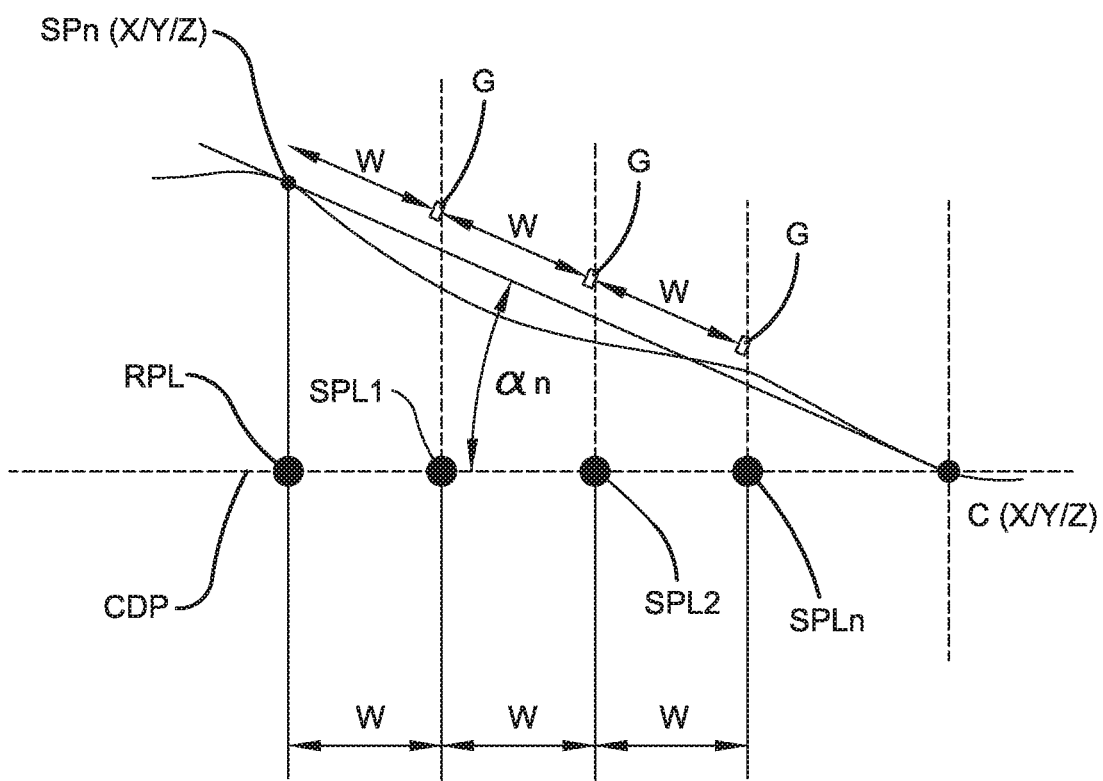
FIG. 13 is another graphic depiction of the inclination of field from FIG. 10, further illustrating positions of the subsequent path lines from FIG. 12 being spaced apart on the reference plane by a working width.

In more detail, FIG. 13 illustrates path lines SPL1 . . . SPLn generated on the center datum plane CDP based on a separation distance in the form of working width W. Specifically, the reference path line RPL and subsequent path lines SPL1 . . . SPLn are indicated as points where the path lines SPL1 . . . SPLn intersect the segmentation plane SDPn along the center datum plane CDP. The initial subsequent path line SPL1 is created by spaced apart from the reference path line RPL by the working width W. Similarly, each subsequent path line SPLn is offset from a previous subsequent path line SPLn-1 by the working width W. However, such a standard working width W is generally determined based on the field being flat and level. Thus, for fields that are sloped or that have significant undulations, subsequent path lines SPL1 . . . SPLn that are spaced apart by the working width W may not take into consideration such undulations, which can lead to areas of the field being worked with too much overlapping or, alternatively, with significant gaps. Such overlapping and/or gaps between working areas within the field are indicated with reference letter G in FIG. 13. With reference to the center pivot system 30, overlapping and/or gaps can, for example, lead to areas of the field receiving too much water, too little water, too much fertilizer and or too little fertilizer.

Figure 14:
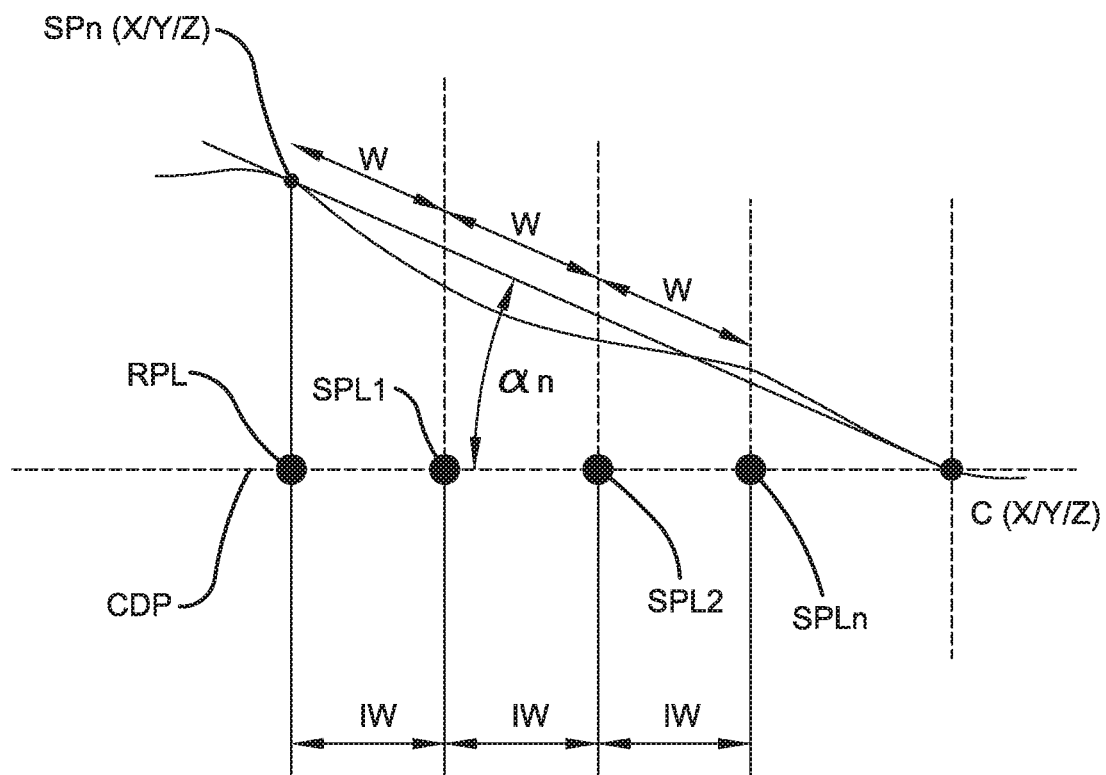
FIG. 14 is another graphic depiction of the inclination of the field from FIG. 10, further illustrating positions of the subsequent path lines from FIG. 12 being spaced apart on the reference plane by a compensated working width.

Embodiments of the present invention provide for an improvement in generating the positions of the subsequent path lines subsequent path lines SPL1 . . . SPLn on a two-dimensional reference plane (e.g., the center datum plane CDP) so as to minimizing any overlapping and/or gaps between working areas on the field. Specifically, as illustrated in FIG. 14, embodiments of the present invention use the inclination angles $\alpha 1$ . . . $\alpha n$ previously determined for each segmentation point SP1 . . . SPn to modify the working width W. Such modification may be referred to elsewhere herein as a terrain adjustment. In more detail, the working width W can be transformed to a terrain-adjusted working width IW (i.e., the working width is compensated based on the terrain of the field) using the following equation:

$$IW = W^* \cos \alpha n$$

As such, given an original working width W, the terrain-adjusted working width IW is determined by adjusting the original working width W by a factor that is based on the height of the segmentation points SP1 . . . SPn. Because the factor (i.e., COS $\alpha n$) is based on the angel of the radial vector RSPn, the compensation or adjustment of the working width W is based, at least in part, on the radial vector RSPn or, similarly, on the angle (i.e., $\alpha n$) that the radial vector makes with the center datum plane CDP. Stated differently, the terrain-adjusted working width IW, and, thus, the positions of the subsequent path lines subsequent path lines SPL1 . . . SPLn are adjusted based on the actual, physical terrain of the field. Embodiments of the present invention can, thus, use the terrain-adjusted working width IW to separate the subsequent path lines SPL1 . . . SPLn, which results in significantly minimizing excessive overlaps or gaps in the working areas of the field. An example of a two-dimensional land map with the reference path line RPL and the subsequent path lines SPL1 . . . SPLn separated by the terrain-adjusted working widths IW is illustrated in FIG. 12.

The process described above, which includes the steps of the method 40 illustrated in FIG. 3, assumes that the ground surface or the terrain of the field follows a generally straight line between center point C and each segmentation point SP1 . . . SPn (i.e., radial vectors RSP1 . . . RSPn, such as RSPn shown in FIG. 10). However, it is common for the terrain of a given field to deviate in more complex manners. Nevertheless, the process described above may be configured to work as sufficiently for more complex terrains, such as with fields with severe undulating surfaces.

Figure 15:
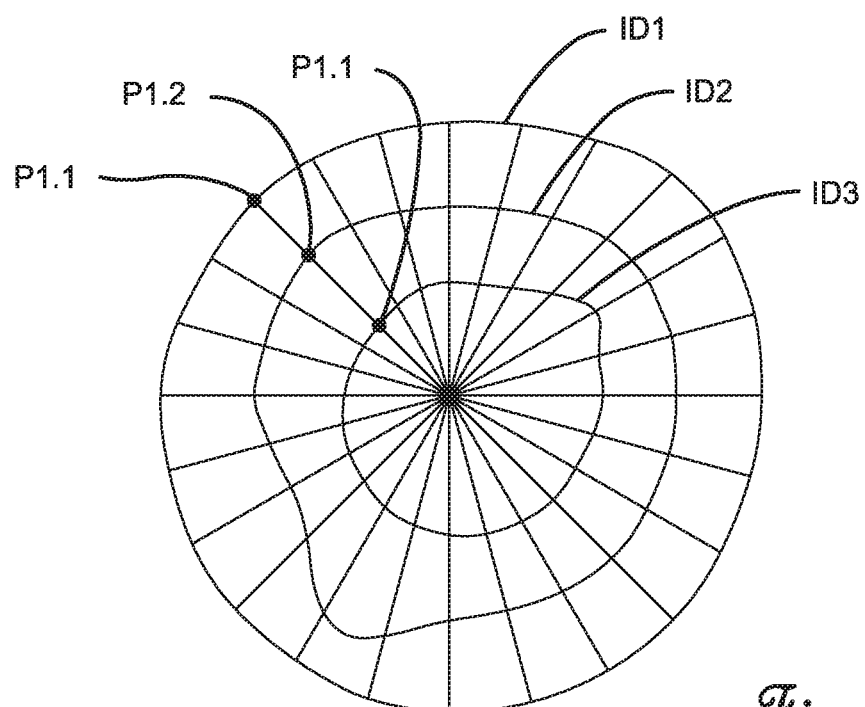
FIG. 15 is an overhead plan view of a field with a plurality of routes formed thereon.

In more detail, certain embodiments of the present invention are configured to address scenarios in which a field is not planar but, instead, presents significantly undulations. According to such embodiments, the mobile machine 12 with the sensor 14 may be required to drive along multiple routes through the field to collect position data. For example, with reference to FIG. 15, a user may drive the mobile vehicle 12 through the field along multiple routes ID1, ID2 . . . IDn, so as to obtain additional and/or more accurate position data for the field. FIG. 15 shows an overhead, plan view of the paths made by the mobile machine 12 along the multiple routes ID1, ID2 . . . IDn through the field. In some instances, each of the drives along the routes ID1, ID2 . . . IDn may be made by following visible tracks made by the wheels of each successive wheeled support 36 of the center pivot system 30. As was described previously, such position data may be transmitted from the mobile vehicle, via the sensors 14, to the mapping device 16 for further processing, such as will be described in more detail below.

Figure 16:
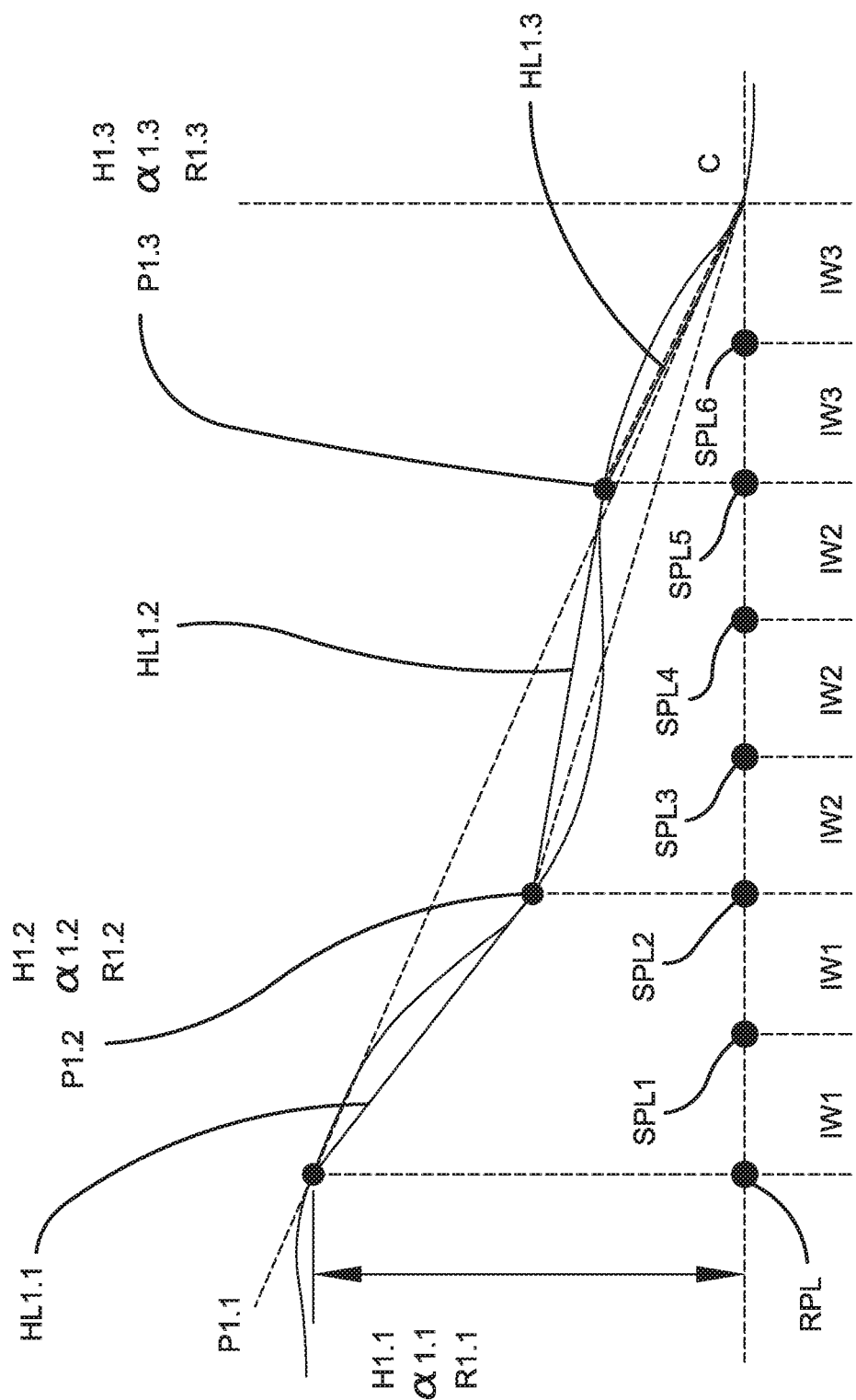
FIG. 16 is graphic depiction of an inclination of the field from FIG. 15 with respect to a segmentation plane extending through the center point and segmentation points P1.1, P1.2, and P1.3 that lie on the plurality of routes, with subsequent path lines formed on a two-dimensional reference plane and being separated by compensated working widths.

Based on the position data captured along each route ID1, ID2 . . . IDn, three-dimensional model pivot paths for each route can be generated in a manner similar to that described above with respect to the model pivot paths M. Once the model pivot paths have been created for each route ID1, ID2 . . . IDn, the segmentation planes SDP1 . . . SDPn may be use, as was described previously, to determine intersection points between the segmentation planes SDP1 . . . SDPn and the model pivot paths generated with respect to each route ID1, ID2 . . . IDn. As shown in FIG. 16, such an intersection of a segmentation plane SDPn with the model pivot paths (i.e., corresponding to drives ID1, ID2, and ID3) is represented by points P1.1, P1.2, and P1.3. Each of the points P1.1, P1.2, and P1.3 may be associated with a height H1.1, H1.2, and H1.3 representing the height above the center point C, which may be determined by comparing the Z-coordinates of each point P1.1, P1.2, and P1.3 and the center point C. In addition, the position data for each point P1.1, P1.2 and P1.3 and the center point C can be used to generate a height profile comprising multiple height line vectors HL1.1, HL1.2 and HL1.3, which extend between adjacent points P1.1, P1.2, P1.3, and the center point C by respective inclination angles $\alpha 1.1$, $\alpha 1.2$ and $\alpha 1.3$. More generally, height line vector HL1.n extends between points P1.n and P1.n+1 and forms an angle $\alpha 1.n$ with a reference plane tangential with the WGS-84 ellipsoid, such as center datum plane CDP. However, it should be noted that the innermost height line (e.g., height line HL1.3 from FIG. 16) will extend between the innermost point (e.g., point P1.3) and the center point C.

Similar to the method described above with respect to FIG. 14, embodiments of the present invention may be used to determine a terrain-adjusted working widths IW by which to separate subsequent path lines located between each point P1.1, P1.2, and P1.3. However, instead of sharing a common terrain-adjusted working width IW, the subsequent path lines may have their own individual terrain-adjusted working width IW based on whether they are located between point P1.1 and point P1.2, between point P1.2 and point P1.3, or between point P1.3 and the center point C. Stated differently, embodiments of the present invention provide for each of the height lines vector HL1.1-HLn to be used to generate an individual terrain-adjusted working width IW, which can be used to separate the subsequent path lines located between each point P1.1 . . . P1.$n$. Such individualized terrain-adjusted working widths IW may be determined by the following equation (with the inclination angle α1.$n$ being the inclination angle for the associated height line vector HL1.$n$):

$$IW = W * COS\ \alpha 1.n$$

Thus, as illustrated in FIG. 16, subsequent path lines (i.e., SPL) between adjacent points P1.1 . . . P1.$n$ can be separated by individualized terrain-adjusted working widths IW. For example, a first terrain-adjusted working width IW1 can be used to separate subsequent path lines SPL1 and SPL2, which are positioned between point P1.1 and Point 1.2. Such terrain-adjusted working width IW1 is adjusted using the angle α1.1 of height line vector HL1.1. Similarly, other individual terrain-adjusted working widths IW can be used to separate subsequent path lines between other adjacent points P1.1 . . . P1.$n$. The particular angle α1.$n$ used to adjust such other terrain-adjusted working widths IW should be the angle α1.$n$ of the height line vector HL1.$n$ that connects the points P1.$n$ and P1.(n+1) between which the subsequent path lines being separated are located.

In some embodiments, if a particular terrain-adjusted working width IW would extend beyond an adjacent point (e.g., with reference to FIG. 17—the third working width IW2 between point 1.1 and point 1.2 would extend past point P1.2), then embodiments provide for such an overlapping working width IW to be further adjusted, as described below. For example, in FIG. 17, the overlapping working width IW2 (i.e., the third working width IW between point P1.1 and point P1.2) may be split into ΔW1 and ΔW2. Each of ΔW1 and ΔW2 may be calculated as follows:

$$\Delta W1 = W * COS\ \alpha 1.1$$

$$\Delta W2 = W * COS\ \alpha 1.2$$

Figure 17:
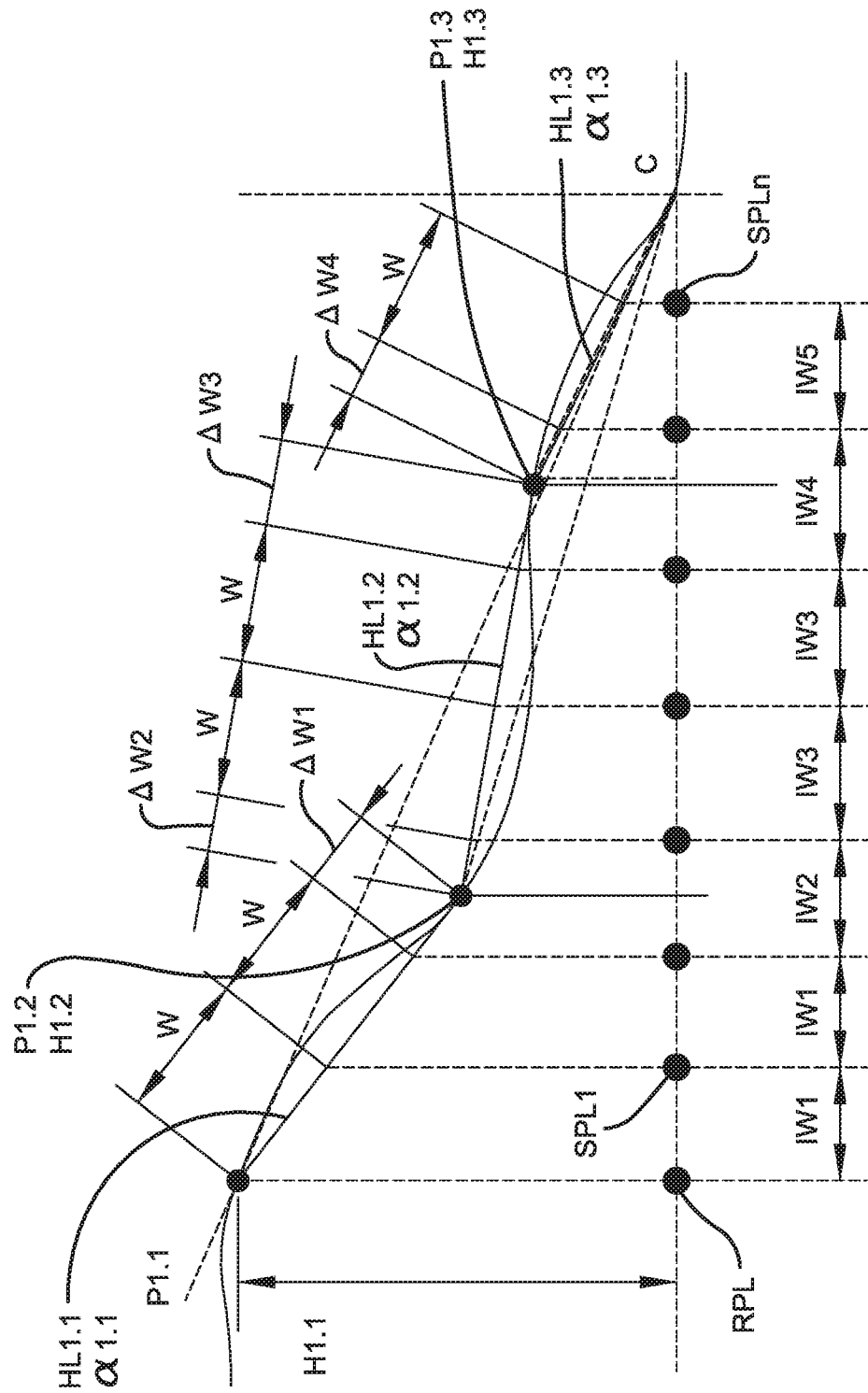
FIG. 17 is another graphic depiction of the inclination of the field from FIG. 15 with respect to a segmentation plane extending through the center point and segmentation points P1.1, P1.2, and P1.3, with subsequent path lines being separated by further embodiments of compensated working widths.

As such, ΔW1 may be applied with respect to the height line HL1.1, while ΔW2 may be applied to the subsequent height line HL1.2. The values determined for ΔW1 and ΔW2 may, therefore, be summed to generate the width IW2. A similar process may be used to determine working width IW4, which overlaps point P1.3, as illustrated in FIG. 17.

Figure 18:
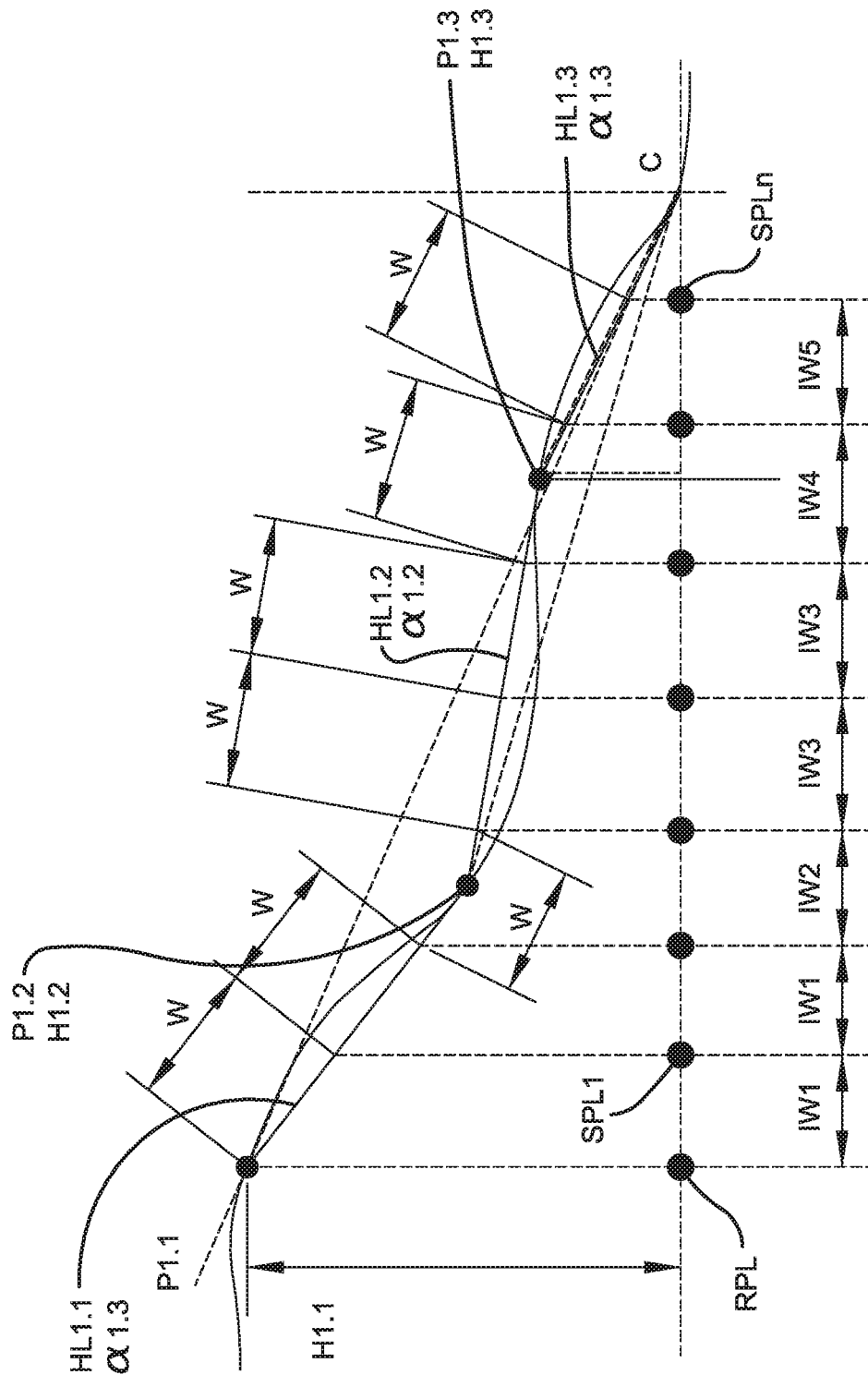
FIG. 18 is another graphic depiction of the inclination of the field from FIG. 15 with respect to a segmentation plane extending through the center point and segmentation points P1.1, P1.2, and P1.3, with subsequent path lines being separated by still further embodiments of compensated working widths.

Alternatively, as illustrated in FIG. 18, a terrain-adjusted working width IW that extends beyond an adjacent point may be adjusted by considering an original working width's intersection with a subsequent height line. For example, the third terrain-adjusted working width (i.e., IW2), which extends beyond point P1.2 may be determined by considering the intersection of the third original working width W (shown above the height lines HL1.1 and HL1.2 in FIG. 18) with the height line HL1.2. As such, due to the angle α1.2 of HL1.2 being less than the angle α1.1 of height HL1.1, the third terrain-adjusted working width (i.e., IW2) is greater than the first and second terrain-adjusted working widths (i.e., IW1) but less than the fourth and fifth terrain-adjusted working widths (i.e., IW3). Either of such above-described processes, i.e., as illustrated in FIGS. 17 and 18, may be used to adjust those terrain-adjusted working widths IW that extend beyond any of the points P1.2 . . . P1.$n$.

As described above, embodiments of the present invention may be used to generate terrain-adjusted paths on a two-dimensional land map of a land area. For instance, FIG. 12 illustrates an example of such a two-dimensional land map, such as may be used to guide a center pivot system 30 for irrigating a crop field. To begin, a mobile machine 12 traverses field to capture position data over the mobile machine's 12 route. Such position data can be used to generate a three-dimensional curve of the mobile machine's 12 route, such as the model pivot path M previously described. Embodiments may also project the model pivot path M onto the two-dimensional land map to generate a reference path line RPL. It should be understood that the center datum plane CDP discussed above, onto which the reference path line RPL and the subsequent path lines SPL were formed, can be considered a two-dimensional land map. From the position data, embodiments can also determine a center point C for the model pivot path M and/or of the field. Next, the model pivot path M can be partitioned into a plurality of segments, with each segment including a segmentation point SP lying on the model pivot path M. Embodiments may, then, determine a radial vector RSP between the center point C and each segmentation point SP. As is generally understood, the radial vectors RSP will include information indicative of the distances between the center point C and each of the segmentations points SP, as well as inclination angles between the center point C and each of the segmentations points SP. As such, based on such radial vectors RSP, embodiments can generate one or more subsequent path SPL lines on the two-dimensional land map, with the subsequent path lines SPL being spaced apart from the reference path line by a distance that is based, in part, on the radial vector RSP. Specifically, for instance, the subsequent path lines may be spaced apart from the reference path line RPL based on a distance related to the angle made by the radial vector with the center datum plane CDP and/or the two-dimensional land map. Thus, embodiments provide for the generation of a two-dimensional land map with terrain adjusted paths positioned thereon. Specifically, embodiments provide for the generation of such a two-dimensional land map for a land area based on height and angle profile information obtained and/or determined for the surface of the land area.

Figure 19:
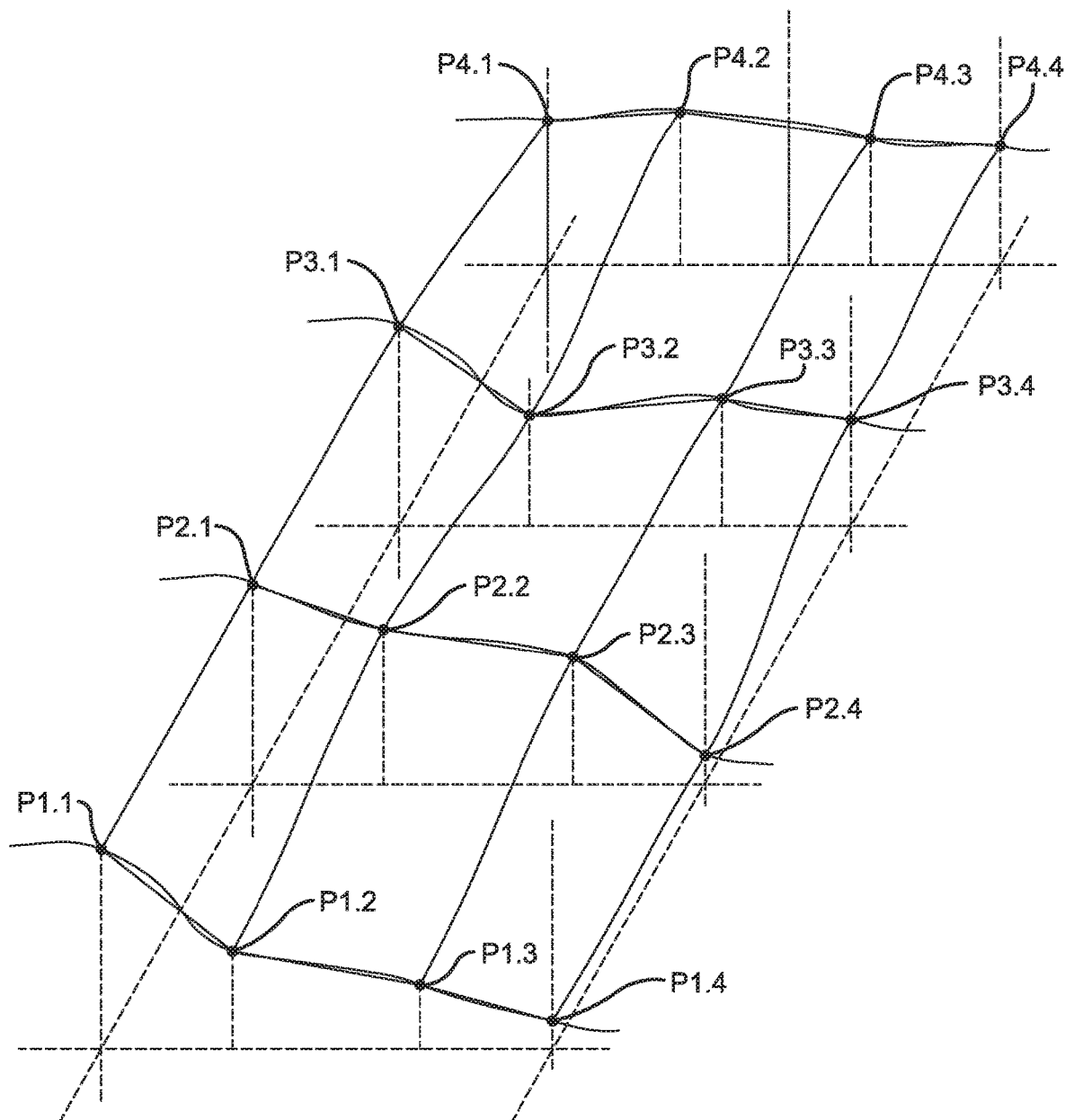
FIG. 19 is a graphic depiction of a height profile for a non-circular field.

Embodiments of the present invention may also be used to generate a height profile for non-circular fields (e.g., for rectangular fields). As illustrated in FIG. 19, a mobile machine 12, including one or more associated sensors 14 (e.g., position detection devices) may be driven along routes extending through a non-circular field. For instance, a first drive path may be driven from point P1.1 to point P4.1. Next, a second drive path may be driven from point P1.2 to P4.2. A third drive path may, then, be driven from point P1.3 to point P4.3. Such drive paths may be repeated until the entirety of the field has been traversed by the mobile machine 12. In some alternative embodiments, one or more autonomous mobile machines 12 may be driven along each of the drive paths.

Regardless, the mobile machine 12 can capture position data along each of the drive paths, such that embodiments of the present invention can determine a height profile for the field by using methods similar to those described above with respect to FIGS. 16-18. For example, three-dimensional model paths can be generated for the positions obtained along each drive path. Next, height lines (i.e., vectors extending between adjacent points) can be generated between each adjacent point (e.g., between P1.1 and P1.2, between P1.2 and P1.3, between P1.3 and P1.4, etc.) so as to determine a height profile for the field. Such points may be considered segmentation points, the positions of which can be determined by intersecting a datum plane through the three-dimensional model paths. As a result, subsequent path lines can be created on a two-dimensional land map of the field, with such subsequent path lines being separated by compensated working widths IW that are generated based on the field's determined height profile. For example, a height line can be obtained between point P1.1 and P1.2, such that an incline adjusted working width can be used to separate subsequent path lines positioned between P1.1 and P1.3. A similar process can be used to generate unique working widths to separate subsequent path lines between generally any points Pm.n . . . Pm.n+1.

Figure 20:
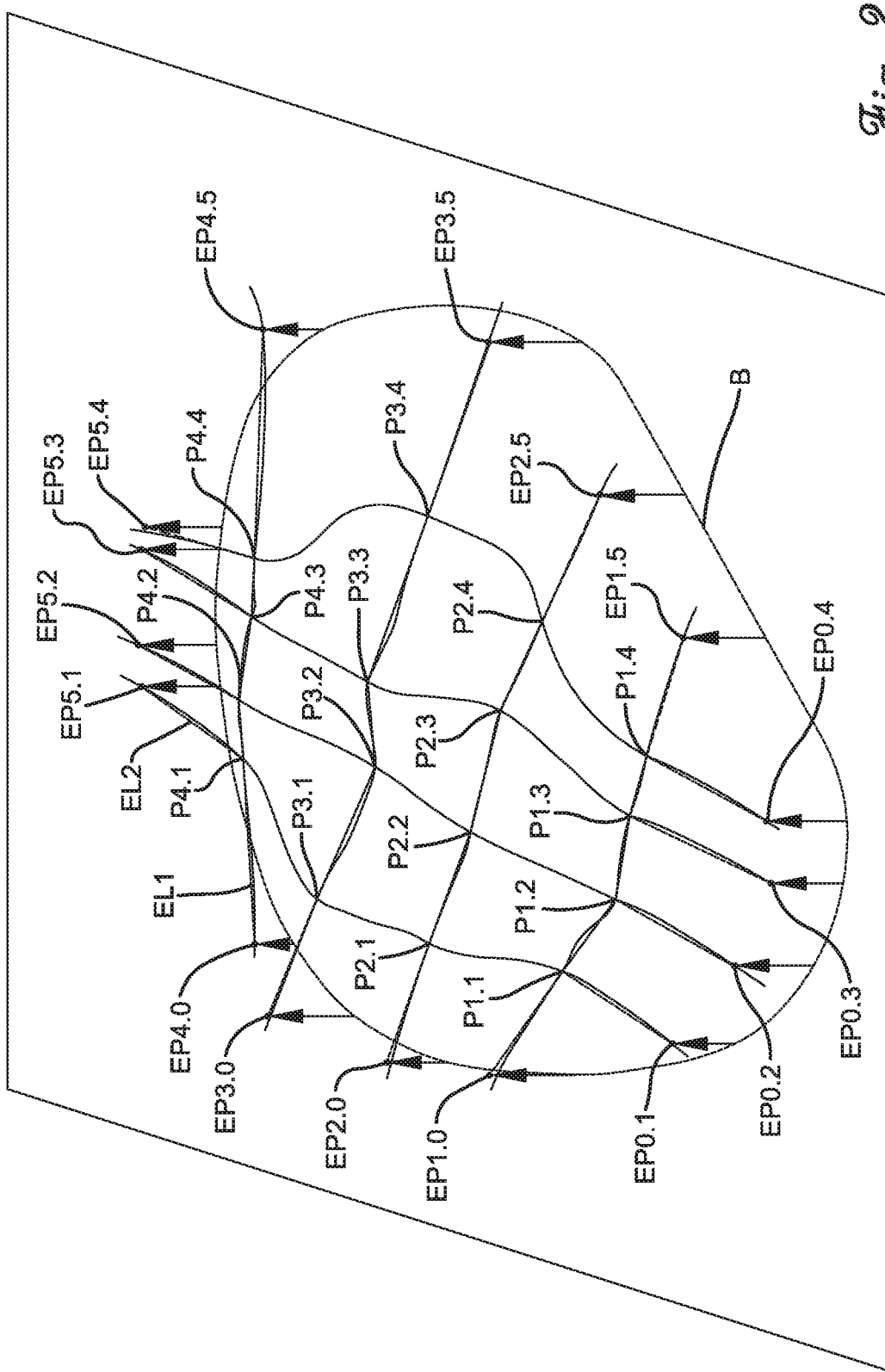
FIG. 20 is another graphic depiction of a height profile for a non-circular field.

It should be understood that such a process is not limited to determining height profiles for even rectangular fields. For example, the drive paths (i.e., from point P1.1 to point P4.1, from point P1.2 to point P4.2, from point P1.3 to point P4.3, and from point P1.4 to point P4.4) may diverge (without intersection if possible) to cover irregular field geometries, such as illustrated in FIG. 20. Furthermore, the height lines (extending in a first direction) and the drive paths (extending in a second direction) may be extended in a tangential direction towards an irregular boundary B by generating extension lines from outer points to a boundary of the field. With reference to FIG. 20, exemplary extension lines EL1 and EL2 extending from point P4.1 to the boundary B are illustrated. In some embodiments, the boundary B may only be available in a two-dimensional reference plane, such as the center datum plane CDP tangential to the WGS-84 Ellipsoid. In such instances, a three-dimensional representation of the boundary B may be generated by extending the two-dimensional boundary B perpendicular to such reference plane to create intersection points with the height lines (in first direction) and/or the drive path (in the second direction) so as to create an intersection of the extension lines with the three-dimensional boundary. Alternatively, in some embodiments, other mathematical methodologies may be used to determine a direction of these extension lines. Remaining with FIG. 20, extension points EP0.1 to EP0.4, EP5.1 to EP5.4, EP1.5 to EP4.5 and EP1.0 to EP 4.0 can be generated by extending the height lines (in first direction) and/or the drive paths (in the second direction) to the boundary B. Such extension points may, then, be used to determine inclination angles between certain adjacent extension points (e.g., between EP4.0 and EP4.1). Furthermore, interpolation may be used to connect points along the three-dimensional boundary, e.g., between points 4.0 and 5.1. Once the three-dimensional position data for the drive paths, the height lines, and the boundary have been determined, such information can then be used to generate compensated working widths for positioning subsequent path lines on a two-dimensional land map of the field.

Figure 21:
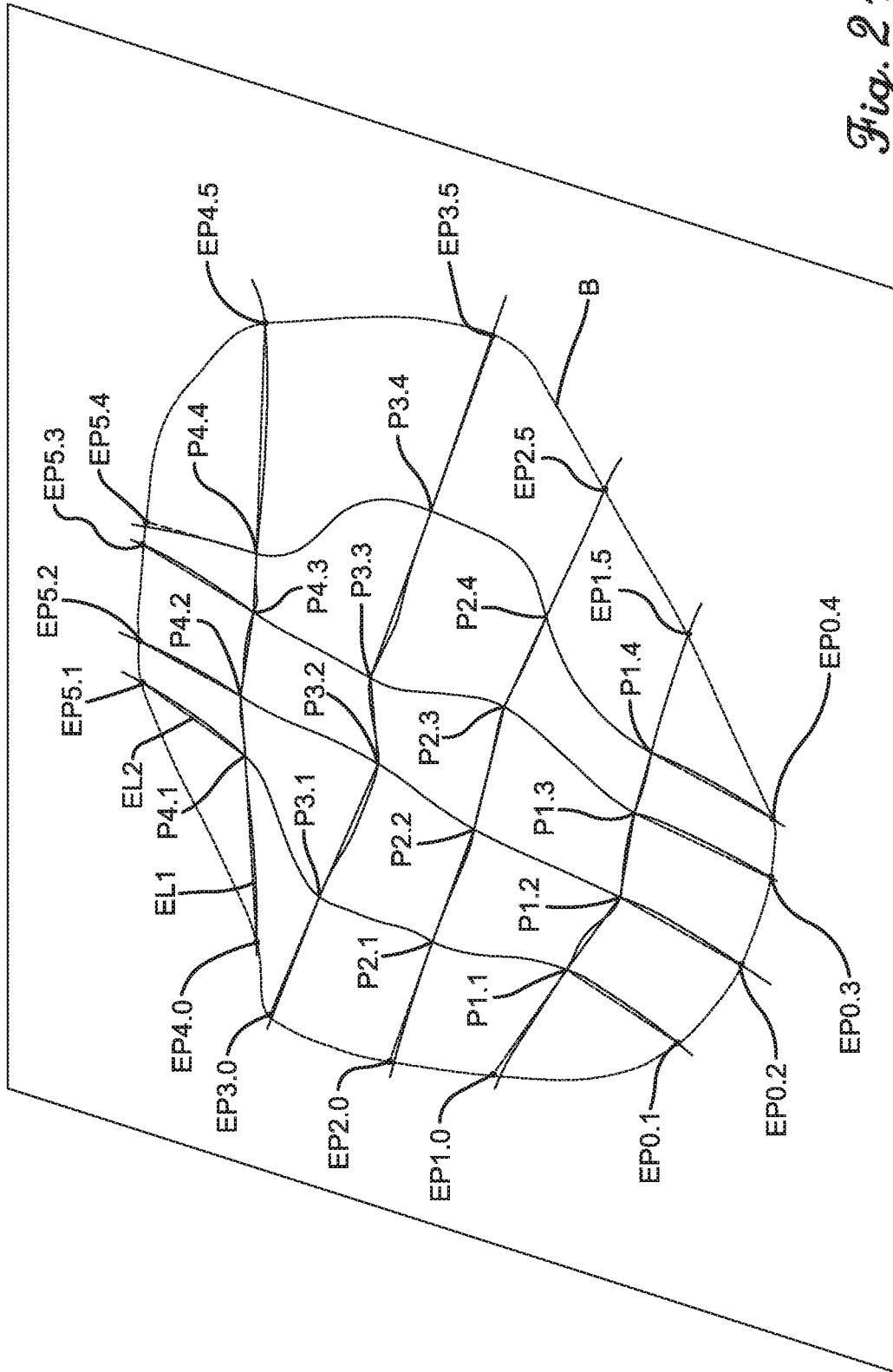
FIG. 21 is still another graphic depiction of a height profile for a non-circular field.

Finally, with reference to FIG. 21, according to another embodiment of the present invention, three-dimensional position data for the boundary B may be captured by, for example, driving around the boundary B. As such, a three-dimensional model boundary path can be generated. Based on the model boundary path, the extension points EP0.1 to EP0.4, EP5.1 to EP5.4, EP1.5 to EP4.5 and EP1.0 to EP 4.0 may be determined by selecting points on the model boundary path and connecting them with adjacent points previously captured during previous drives along the drive paths (e.g., the drive paths extending between point P1.1 to point P4.1, from point P1.2 to point P4.2, from point P1.3 to point P4.3, and from point P1.4 to point P4.4). In some embodiments, the selection of the points on the model boundary path may use the constraint of taking the point with the shortest distance from an adjacent drive path. Alternatively, the selection of the point on the model boundary path may include intersecting a virtual datum plane with the model boundary path. Such a virtual datum plane should be perpendicular to a reference plane tangential to the WGS-84 Ellipsoid (e.g., the center datum plane CDP) and should extend through points on adjacent drive paths. As such, height lines can then be generated between the drive paths and the model boundary path. As was described above with respect to FIG. 20, once the three-dimensional position data for the drive paths, the height lines, and the boundary have been determined, such information can then be used to generate compensated working widths for positioning subsequent path lines on a two-dimensional land map of the field.

The above embodiments include systems and methods for generating a two-dimensional land map of a field. The two-dimensional map can include pathing information, such as pivot paths, waylines, or the like, which can be used to accurately guide mobile machines 12 through the field. For instance, the guidance controller 18 of the present invention may use the generated two-dimensional land map to guide a mobile machine along one or more paths included on the land map. For instance, the guidance controller 18 may instruct a center pivot system 30 to follow one or more reference and/or subsequent path lines provided within the two-dimensional land map of the field. Although such land map is two-dimensional, the reference and/or subsequent path lines have been compensated to account for the three-dimensional terrain of the field. As such, movement and/or operation of the center pivot system 30 can be accurately and efficiently guided. Furthermore, because the land map is two-dimensional, the land map can be stored, such as in the mapping device 16, efficiently without requiring significant amounts of data storage. Similarly, the processing requirements for guidance systems, such as guidance controller 18, can be minimized when using the two-dimensional land map to guide the movement and/or operation of the center pivot system 30.

Autonomous Mapping

Figure 22:
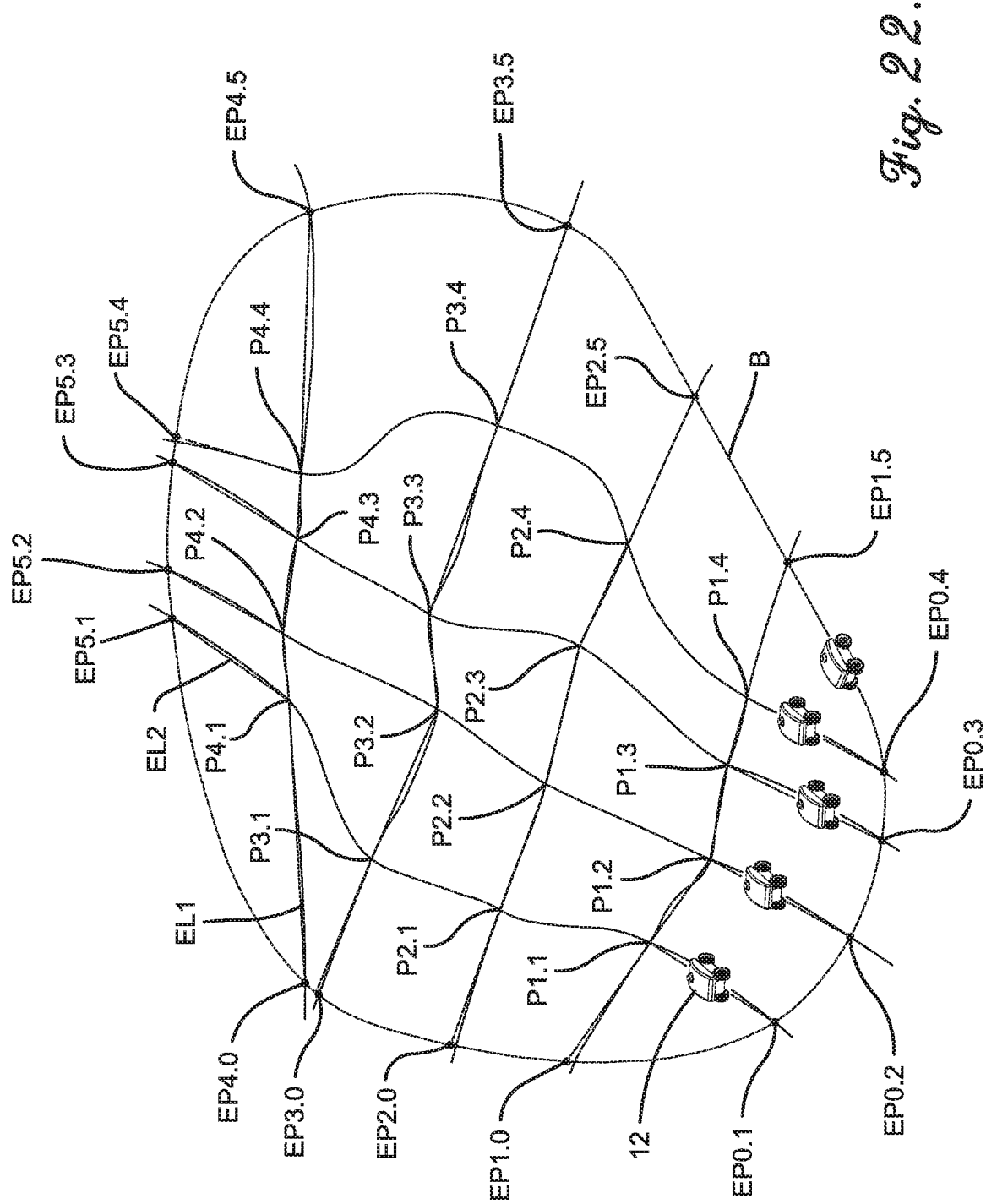
FIG. 22 is a graphic depiction of a plurality of autonomous mobile machines being used to generate a height profile for a field.

In addition to generating land maps by, inter alia, manually driving a mobile machine 12 along routes through a field to capture field data, additional embodiments of the present invention may generate a land map using one or more autonomously-operated mobile machines 12, such as illustrated in FIG. 22. Such autonomous mobile machines 12 may be in the form of ground-based robotic machines that are programmed to drive a selected route through a field and capture field data. As such, the autonomous mobile machines 12 may be in the form of small, wheeled or tracked robotic machines. The use of such small robotic machines may be preferred over larger machines (e.g., agricultural tractors) as small robotic machines can be made to operate in a highly efficient manner, using little fuel or electrical energy. However, it should be understood that in some embodiments, large automated heavy-equipment machines (e.g., agricultural tractors) may also be used. In still other embodiments, the autonomous mobile machines 12 may be aerial vehicles configured to fly over the field to collect field data.

Some embodiments of the present invention may provide for plurality, or a "swarm," of autonomous mobile machines 12 to be used. Certain embodiments may provide for at least 2, at least 4, at least 6, at least 8, at least 10, or more autonomous mobile machines 12 to be used. For example, FIG. 22 illustrates a field in which five autonomous mobile machines 12 are programmed to drive along individual routes or drive paths through a field. As the autonomous mobile machines 12 drive along their drive paths, each autonomous mobile machine 12 captures field data via sensors 14 associated with the autonomous mobile machine 12. The autonomous mobile machines 12 then transmit such field data to the mapping device 16, such as via the communications network 20. As noted previously, embodiments provide for the mapping device 16 may be positioned within one of the autonomous mobile machines 12, within a facility near the field, or remote from the field (e.g., in a cloud-based environment). Regardless, the mapping device 16 can create a land map using the captured field data. For example, in embodiments in which the field data is position data (e.g., X, Y, and Z-coordinates), the mapping device 16 can generate a two or three-dimensional map of the field using the captured position data. The mapping of the field can be created using the method 40, as described above, or by using a Triangulate Irregular Network process, as will be described in more detail below. Beneficially, the autonomous mobile machines 12 can be programmed to automatically map the field to any predetermined accuracy, as may be required.

Figure 23:
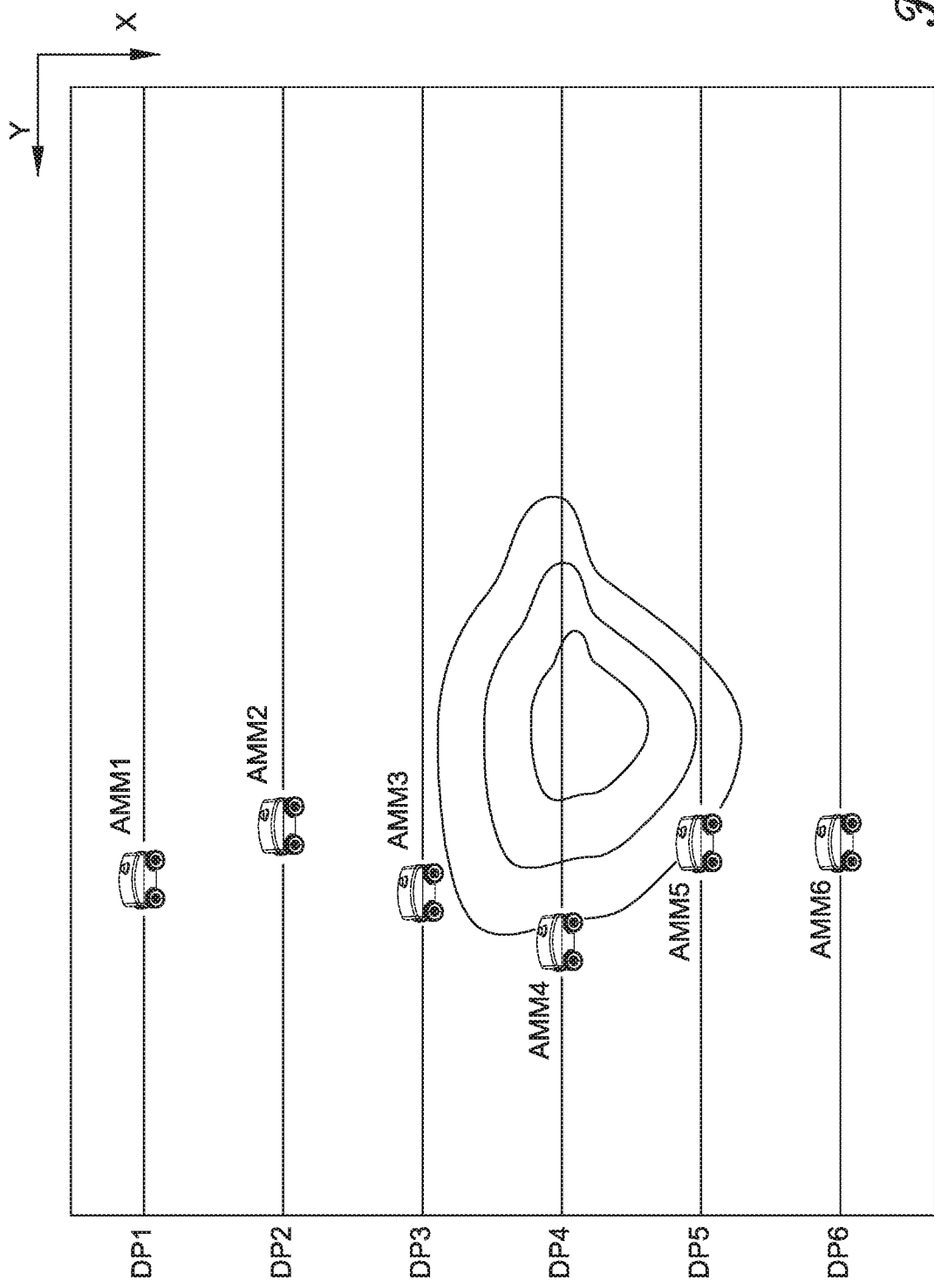
FIG. 23 is another a graphic depiction of a plurality of autonomous mobile machines being used to obtain field data across a field, with the autonomous mobile machines following regularly spaced apart initial drive paths.

To begin the mapping of the field, the autonomous mobile machines 12 may be programmed to traverse routes or drive paths through the field. In some embodiments, the planning may be performed by the mapping device 16, while control of the autonomous mobile machines 12 may be performed by the guidance controller 18. As illustrated in FIG. 23, each autonomous mobile machine 12 (i.e., AMM1-AMM6) may be programmed to traverse an individual drive path (i.e., DP1-DP6) through the field, with adjacent drive paths being separated by a fixed, predetermined distance. Such predetermined distance may, in some embodiments, be based on a size of the field, so as to provide for the swarm of autonomous mobile machine 12 to be able to traverse the field in a single pass. Although the exemplary drive paths are shown as straight, parallel lines, it should be understood that the drive paths may have generally any shape (e.g., zig zag). In general, a boundary of the field should be known so that the autonomous mobile machines 12 can be programmed to follow drive paths within the boundary. Such boundary may be known from previously-obtained data or land maps, or may be entered manually by a user. If positions of objects or obstacles (e.g., building, trees, streets, rivers, or ponds) are known, such as from previously-obtained data or land maps, the autonomous mobile machines 12 may be programmed to drive around such objections or obstacles. In some embodiments, such previously-obtained data or land maps may be downloaded to the system 10 for use in planning the original drive paths DP1-DP6. In other embodiments, aerial images may be taken of the field (e.g., via an airborne autonomous mobile machine 12 or from GOOGLE maps). Based on such image, user may determine a boundary of a field, or a particular portion of the field, within which to plan the original drive paths.

As the autonomous mobile machines 12 traverse their individual drive paths, the sensors 14 of the autonomous mobile machines 12 will collect field data. In some embodiments, such data will be collected continuously along the drive paths. In other embodiments, the data will be collected periodically over a given time frame, over a given distance driven, or at certain X, Y-coordinates. As previously discussed, sensors 14 of the system 10 may be capable of capturing various types of field data. For example, in some embodiments, the sensors 14 may comprise position determining devices capable of capturing position data (e.g., X,Y, and Z-coordinates) along the drive paths. In some embodiments, the sensors 14 of the autonomous mobile machines 12 may collect position data in the form of GPS data, which is sent to the mapping device 16 to generate corresponding X, Y, and Z-coordinates. However, in other embodiments, the autonomous mobile machines 12 may be configured to collect other types of field data, such as soil conditions (e.g., light amount, humidity, moisture, temperature, granularity, density, compaction, etc.), soil chemical composition (e.g., fertility, nitrogen content, phosphorous content, potassium content, pH value, fertilizer concentration, pesticide concentration, etc.), or the like, as has previously been described. In even further embodiments, the autonomous mobile machines 12 may collect data in the form of object or obstacle positions, such as via sensors 14 in the form of cameras.

As the swarm of autonomous mobile machines 12 collect field data, embodiments provide for the mapping device 16 to analyze the collected field data to determine whether the swarm of autonomous mobile machines 12 is required to make additional passes through the field to obtain a required mapping accuracy. In some embodiment, collected field data will be compared against expected or baseline values to determine if any portion of the field data deviates from baseline or average values of the field data. If the collected field data does deviate from such baseline or average values, then embodiments may determine that one or more anomalous areas are present within the field. The expected or baseline values may be obtained from previously-obtained data or previously-available land maps of the field. For instance, the expected or baseline values may comprise a slope value of the land area adjacent to a boundary of the land area. Alternatively, a user may manually enter the expected or baseline values, as necessary.

In other embodiments, the collected field data may be compared with itself to determine if any portion of the field data deviates from baseline or average values of the collected field data. If the collected field data does exceed such baseline or average values, then embodiments may determine that one or more anomalous areas are present within the field. For example, in embodiments in which the field data comprises position data, embodiments may compare the height data collected by each of the autonomous mobile machines 12 along their drive path. If any of the measured heights deviates more than a predefined amount from a baseline or an average height of the other measured heights, then embodiments may determine that an anomalous area exists within the field and additional measurements are needed. In addition, if the collected field data indicates that the field's surface along one or more drive path driven by the autonomous mobile machines 12 have height profiles that are not uniform (e.g., do not have constant inclination or curves), such as that show the field's terrain having substantial undulation, then embodiments may determine that an anomalous area exists within the field and additional measurements may be needed. To obtain such additional measurements, embodiments may provide for the autonomous mobile machines 12 to be re-programmed to travel along new drive paths so as to increase the accuracy of the field data being collected.

Figure 24:
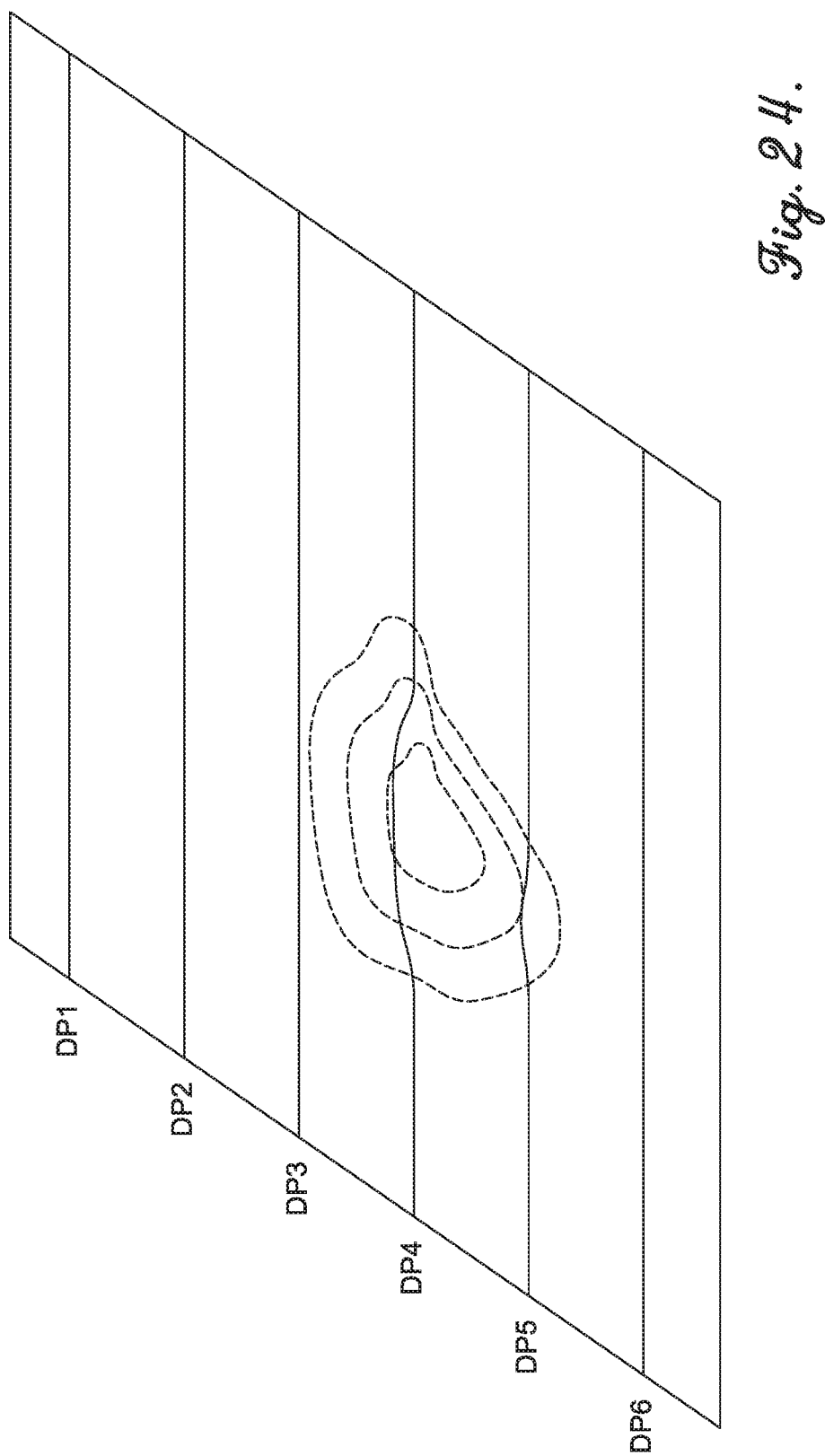
FIG. 24 is a graphic depiction of field data obtained by the autonomous mobile machines traversing the drive paths of FIG. 23.

For example, with reference to FIG. 24, in which position data was collected by autonomous mobile machines 12 AMM1 . . . AMM6 driving along drive paths DP1 . . . DP6, analysis of the position data indicates that autonomous mobile machines 12 AMM1, AMM2, AMM3, and AMM6 have recorded height data along their respective drive paths DP1, DP2, DP3 and DP6 that show minor height variations. As such, the surface of the field between DP1 and DP3 may be analyzed and considered to be level (i.e., flat) or to have a constant inclination. In contrast, the position data collected by autonomous mobile machines 12 AMM4 and AMM5 during their drives along drive paths DP4 and DP5 appear to show height variations along the respective drive path. As such embodiments of the present invention (e.g., the mapping device 16) may determine that the surface of the field between DP3 (collected by AMM3) and DP6 (collected by AMM6) has an anomalous area 50 that is undulated or otherwise has substantial height variations. If embodiments determine that the undulations or height variations in the anomalous area 50 exceed an acceptable or expected value, then embodiments (e.g., the guidance controller 18) may automatically reprogram the autonomous mobile machines 12 to travel along new drive paths that extend through the anomalous area 50 so as to obtain additional field data that can provide a higher accuracy or resolution for the field. Thus, in some embodiments, the mapping device 16 may analyze the collected field data to determine the existence of one or more anomalous areas, and may, thereafter, automatically provide instructions to the guidance controller 18 to re-program the autonomous mobile machines 12 to autonomously drive through the anomalous areas. The guidance controller 18 may then automatically control the autonomous mobile machines 12 to drive along new drive paths through the anomalous area. Such steps may be performed automatically by the system 10 with further human intervention.

In more detail, to obtain a higher accuracy of the field's characteristic (e.g., a higher resolution of the field's height profile), embodiments of the present invention may re-program the autonomous mobile machines 12 to travel along new drive path that extend through the area indicated to have exceeded the acceptable or expected values (i.e., the anomalous area). For example, remaining with the embodiments described above with respect to FIG. 23, in which the autonomous mobile machines 12 were collecting position data to obtain a height profile of the field, the autonomous mobile machines 12 may be re-programmed to travel along new routes between DP3-DP6, as the area between DP3-DP6 appeared to include an anomalous area with significant undulations or height variations. In certain embodiment in which only a single route shows a significant deviation in the collected field data, the autonomous mobile machines 12 may be re-programmed simply to traverse new routes through an anomalous area that is adjacent to the previous initial routes.

Figure 25:
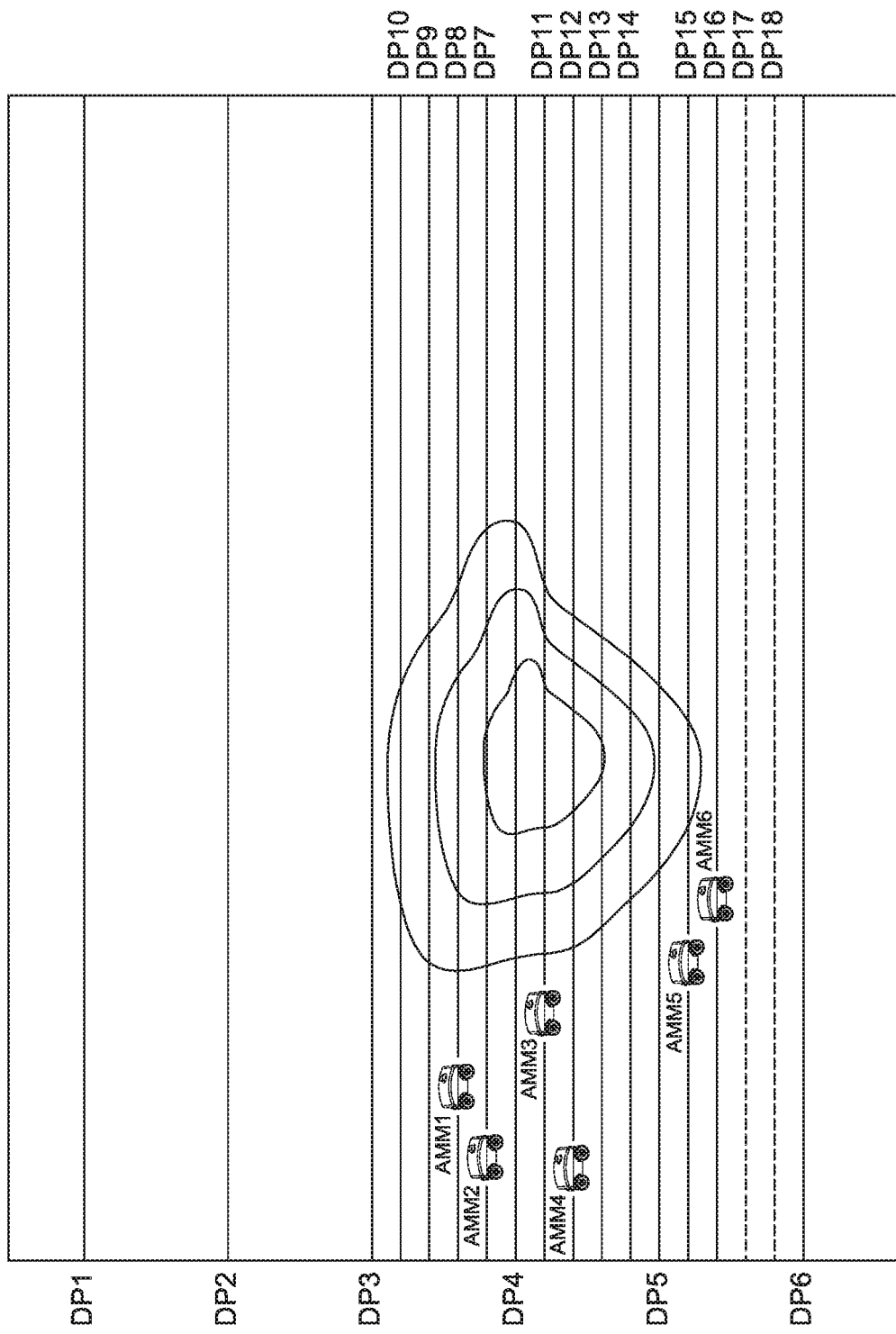
FIG. 25 is another a graphic depiction of the plurality of autonomous mobile machines from FIG. 23 being used to obtain field data for the field, with the autonomous mobile machines following new drive paths extending through an anomalous area of the field.

As illustrated in FIG. 25, the autonomous mobile machines 12 AMM1-AMM6 are illustrated as having been re-programmed to travel along new drive paths DP7-DP18, which extend through the anomalous area 50 between previous drive paths DP3 and DP6. The new drive paths DP7-DP18 may be separated by any specified distance. For example, the drive paths may be separated by equidistant spacing. However, the smaller offset between adjacent drive paths will result in a more detailed collection of field data. FIG. 25 illustrates new drive paths DP7-DP18 having equal spacing between each other or between an original drive path (e.g., drive path DP3 . . . DP6). Embodiments provide for the first of the new drive paths (i.e., DP 7) to be placed near the portion of the field and/or the anomalous area 50 with the most significant deviation with respect to the field data that was collected (i.e., drive path DP4 showed the most significant change in elevation). The remaining drive paths (i.e., DP8-18) can be positioned sequentially (or in any other order) within the anomalous area 50. Regardless, the autonomous mobile machines 12 AMM1-AMM6 can be re-programmed to travel along each of the new drive paths DP7-DP18 so as to collect additional field data along such new drive paths. In embodiments in which there are more drive paths than available autonomous mobile machines 12, subset of the available autonomous mobile machines 12 may be programmed to traverse a subset of the new drive paths. For instance, as shown in FIG. 25, autonomous mobile machines 12 AMM1-AMM2 may be configured to traverse drive paths DP7-DP10, autonomous mobile machines 12 AMM3-AMM4 may be configured to traverse drive paths DP11-DP14, and autonomous mobile machines 12 AMM5-AMM6 may be configured to travers drive paths DP15-DP18. It is noted that the autonomous mobile machines 12 do not need to re-drive along original drive paths DP4 and DP5, as field data was already collected for such drive paths.

As such, the autonomous mobile machines 12 can be caused to drive through the anomalous area of the field along the new routes DP7-DP18 to collect additional field data. Such additional field data can be used to provide a more accurate and precise profile of the field's characteristics. For instance, with respect to the previous embodiments in which the autonomous mobile machines 12 are collecting position data, the mobile machines 12 can travel along each of the new the new drive paths DP7-DP18 so as to collect additional position data within the anomalous area 50. Such additional position data can be used to refine the mapping of the field. In some embodiments if the field data collected along any of the new drive paths DP7-DP18 does not significantly differ from any previously-driven drive path or from an average or expected value, then embodiments may recognize that there is minor variation in the field data and no further driving along drive paths is needed. For example, in FIG. 25, once autonomous mobile machines 12 AMM6 completed its drive along drive path DP16, embodiments may determine that the height data collected along drive path DP16 did not significantly differ from the height collected of previously driven drive path DP6. As such, embodiments may determine that the surface of the field between DP6 and DP16 is generally level or otherwise has a constant inclination/curvature similar to that of drive path DP6. Thus, embodiments may not require that autonomous mobile machines 12 finish driving along the remaining drive paths DP17 and DP18.

Figure 26:
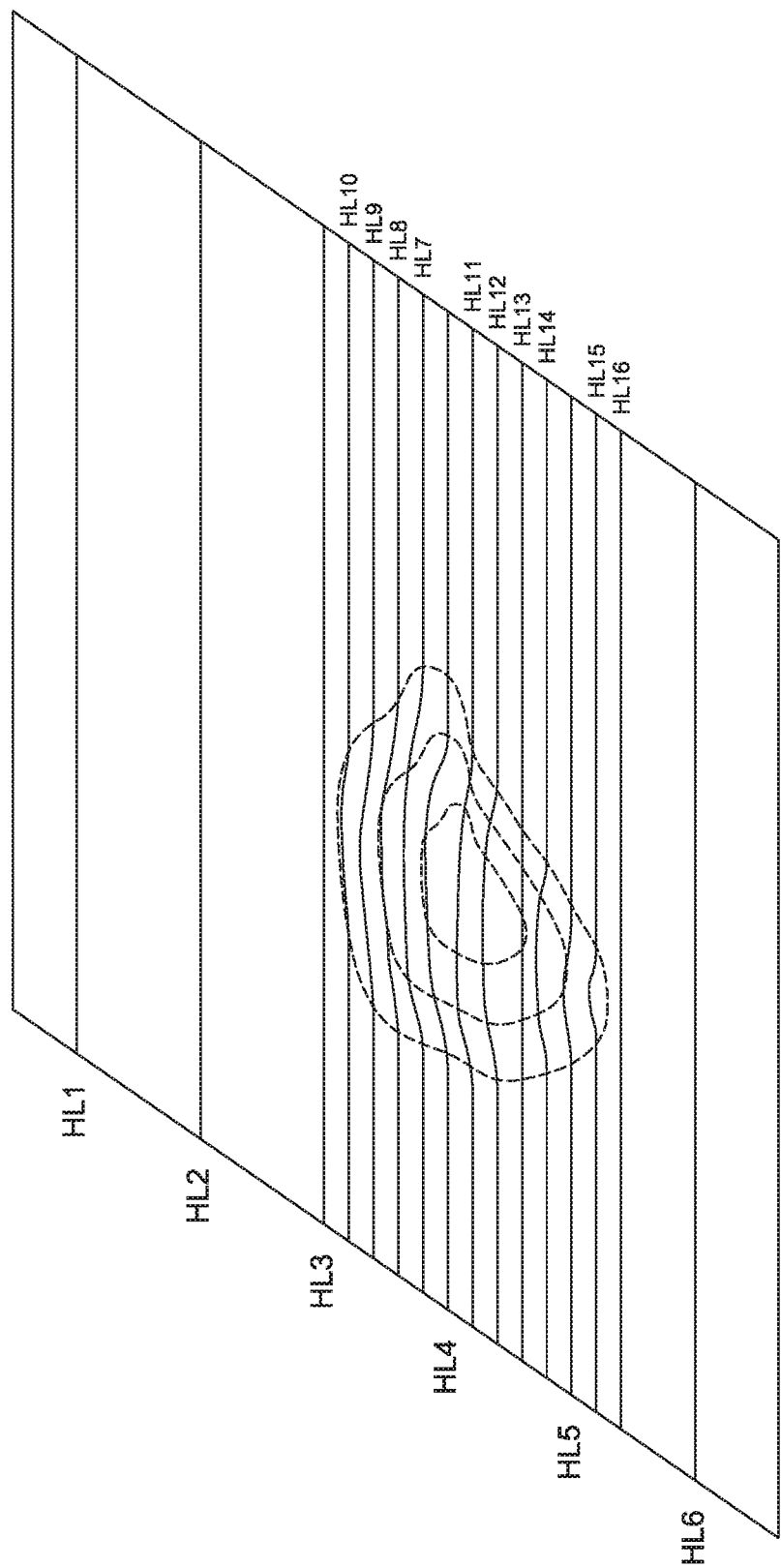
FIG. 26 is a graphic depiction of height lines forming a height profile of the field, with the height lines generated from the field data obtained by the autonomous mobile machines traversing the drive paths of FIG. 23 and FIG. 24.

Once each of the required drive paths (i.e., DP1-DP18) has been driven across by an autonomous mobile machine 12 and field data has been collected for each, then embodiments can generate a land map of the field. Alternatively, the field data may be stored for further use and analysis (e.g., such as to compare with field data collected in the future). As described in the above examples in which the field data is position data, such a land map may comprise a two or three-dimensional land map that includes terrain information. Specifically, the position data (including height data) for each of DP1-DP18 can be used to generate a land map with a height profile of the entire field, as is shown in FIG. 26, which includes a generated height line HL1-HL16 for each drive path DP1-DP16. In such embodiments, the height profile (e.g., HL1-1HL16) of the entire field can be created by initially applying the position data for initial drive paths DP1-DP6, and then subsequently adding the position data for the additional drive paths DP7-DP16. With reference to FIG. 15, a swarm of autonomous mobile machines 12 may also be used to gather data in a circular field with irrigation systems. After driving on the initial routes ID1, ID2 ID3 the autonomous mobile machines 12 may be re-programmed simply to traverse new routes through an anomalous area that is adjacent to the previous initial routes.

The above embodiments include systems and methods for generating a two-dimensional or three-dimensional land map of a field using autonomous machines 12. In embodiments in which the field data is position data, the land map can be used to provide accurate pathing information through the field, such as for pivot paths, waylines, or the like. Because the autonomous mobile machines 12 can be programmed to collect data to any required precision within the field, such land map can be used to accurately and efficiently guide other mobile machines 12 (e.g., agricultural tractors) through the field. For instance, the guidance controller 18 of the present invention may use the generated land map to guide a mobile machine 12 along one or more paths positioned on the land map.

Although the above examples were directed primarily to field data in the form of position data being collected by the autonomous mobile machines 12, it should be understood that generally any type of field data relevant to the characteristics of the field can be collected. For example, as described above, data relevant to the field's soil condition, soil composition, crop/plant condition, or field obstacles can be captured. Furthermore, the precision to which such field data is collected can be made as high as required by re-programming the autonomous mobile machines 12 to collect additional field data, as was described above. For example, the autonomous mobile machines 12 may be re-programmed once, twice, three times, or more, as may be necessary. Based on the collected field data, land maps can be created. For example, a land map illustrating the field's soil condition, soil composition, crop/plant condition, or field obstacles can be generated. Furthermore, mobile machines 12 can be programmed to operate within the field based on such land maps. For example, if a land map indicates that a certain portion of the field (e.g., an anomalous area) is underwatered, then one or more mobile machines 12 can be instructed (e.g., via guidance controller 18) to provide additional water to such portion of the field. Similarly, if a land map indicates that a certain portion of the field (e.g., an anomalous area) is nitrogen deficient, then the mobile machines 12 can be instructed to provide additional fertilizer or other nitrogen rich additive to such portion of the field. Furthermore, the mapping device 16 may be configured to enable the sensors 14 (or related computing devices) to process data collected by the sensors. By way of example, the mapping device 16 may be configured to provide sample data enabling the sensors 14 (or related computing devices) to distinguish between a crop plant and a weed. Enabling the sensors 14 (or related computing devices) to process collected data may have the advantage of reducing the amount of data transferred over the communications network 20 and/or increase the speed of the system.

Mapping Using Irregular Triangulated Networks

Once a two-dimensional land map has been generated or otherwise obtained for a field, embodiments of the present invention may be used to guide mobile machines 12 operating within the field. For example, embodiments may be used to accurately plot swaths of parallel waylines through an uneven or undulating field, so that the mobile machines 12 can be instructed to follow the parallel waylines or waylines adapted by guidance controller 18 as the mobile machines operate through the field. Beneficially, the swaths of parallel waylines can be accurately generated on the two-dimensional land map by compensating such waylines to account for the terrain of the field. As such, the land maps, and the swaths of waylines included thereon, can be stored in a manner that requires substantially less memory than other three-dimensional land maps. Similarly, the two-dimensional land maps, and swaths of parallel waylines included thereon, can be executed with significantly reduced processing power, such as when controlling the mobile machines 12 (e.g., via the guidance controller 18) to follow the swaths of parallel waylines through the field.

To begin mapping swaths of parallel waylines on a two-dimensional land map for a given field, embodiments provide for a height profile to be created for the field. Such a height profile may be created, such as was described above, with the manually-operated or autonomously-operated mobile machines 12 collecting position data via sensors 14. In other embodiments, a height profile may be obtained from previously-available sources, such as position data available from a previously-available land map, from a survey, or otherwise from a public authority. However, it should be understood that the generated or obtained height profile need not include height data for every X, Y-coordinate of field. Instead, embodiments may provide for the generation of a height profile that represents height data for only those significant geographic features of the field. This may be done by a driver of a mobile machine visually inspecting the field prior to driving along the significant geographic features or by a swarm of autonomously-operated mobile machines 12 as described in FIGS. 22 through 26. As such, the amount of data included within the height profile can be minimized, while still including height data for those significant points of the field required to be indicative of the field's height profile.

Using this approach, the amount of work required to generate or collect the height profile can be directly related to the accuracy required, as well as the available data storage and processing power. Depending on the curvature and/or shape of the field, only a small set of locations may be required to have their height data collected. For example, for fields with a very small changes height (e.g., flat, level fields), height data from only a small set of locations may need to be obtained. Alternatively, if the field has numerous undulations or other changes in height, then height data from a larger set of locations may need to be obtained. In general, the locations of the field that are of higher importance for which to collect height data may include: (1) the boundary of the field, and (2) locations in which a slope of the field (i.e., the rate of height change) between the locations and/or between the locations and the field boundary is greater than a predefined amount. After creating the height profile for the field by collecting height data for the boundary and one or more locations within the boundary, if the user finds the height profile is not representative of the precision required, or if the precision requirements change, the user can refine or enhance the height profile, as outlined in more detail below.

Figure 27:
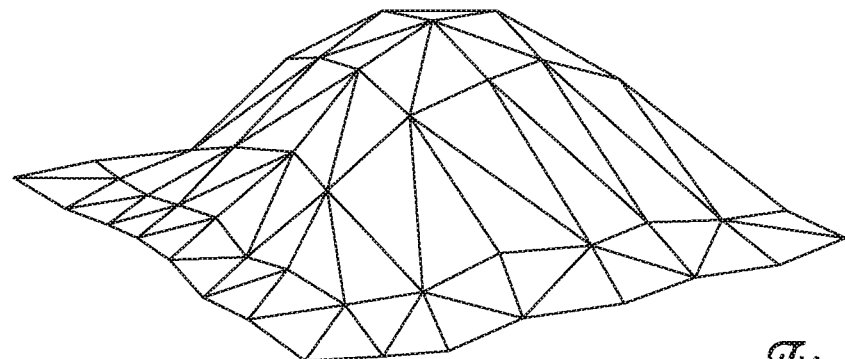
FIG. 27 is a graphic depiction of a triangulated irregular network illustrating three-dimensional contours of a field.

Once the necessary height profile has been obtained (i.e., by capturing the necessary position data), various components of the system 10 can perform the remaining steps of generating a two-dimensional land map with swaths of parallel waylines included thereon. For example, many of such below-described steps may be performed by the mapping device 16. In more detail, embodiments may use such position data to generate a triangulated irregular network ("TIN"). As is generally known, a TIN is digital data structure representation of a three-dimensional surface. Specifically, a TIN is a vector-based representation of a physical surface formed from irregularly distributed nodes and vertices arranged in a network of non-overlapping triangles. An example of a TIN for a given surface is illustrated in FIG. 27, which illustrates a field with an upward-extending mound at a center of the field. To create a TIN, a height profile of the field is required, such as discussed above. Specifically, the height profile should include the positions (i.e., the X, Y, and Z-coordinates) of locations representing (1) the boundary of the field, and (2) one or more interior locations of the field which indicate the field having a slope that diverges from other locations or from the boundary by more than a predefined amount. Generally, such interior locations relate to points in the field where there is a significant change in the shape of the field's surface, such as for example, at the peak of a hill/mountain, the floor of a valley, or at the edge (i.e., top and bottom) of a ridge or cliff.

Figure 28:
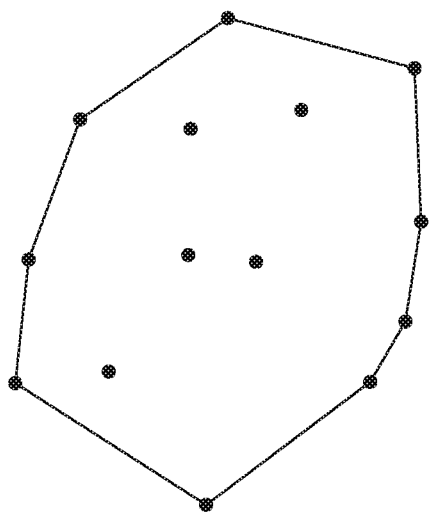
FIG. 28 is a graphic illustration of a point map comprising a plurality of points from a field, with each point in the point map being associated with position data.

FIG. 28 illustrates a point map comprising an exemplary collection of points on a field, with such points indicative of a locations that are associated with position data (e.g., X, Y, and Z-coordinates). As shown, the points of the point map of FIG. 28 comprise boundary points representative of the boundary of the field, as well as a number of interior points representing locations on the field in which in which the surface of the field has a slope that diverges from the boundary by more than a predefined amount. For each of such points, position data, e.g., X, Y, and Z-coordinates, has been collected. The set of points, recorded by the user in the previous step may, in some embodiments, be analyzed using a standard method, such as Ramer-Douglas-Peucker, to reduce the number of superfluous points and therefore surfaces in the resulting TIN.

Figure 29:
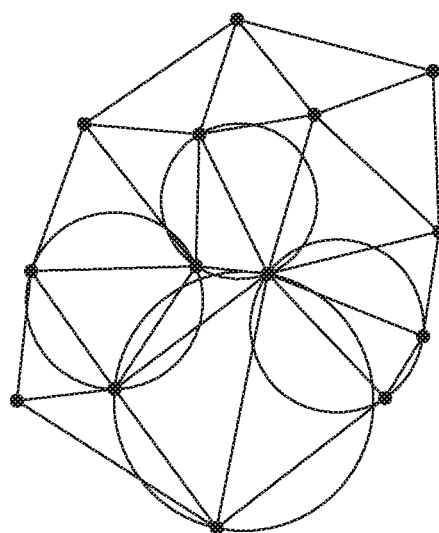
FIG. 29 is a is a graphic illustration of the point map from FIG. 28 having an arrangement of triangles formed thereon to create a triangulated irregular network.

Embodiments provide for a TIN to be created from the point map by arranging a configuration of triangles (representing triangular surfaces) over the point map. The arrangement of triangles may be determined based on various triangle distribution algorithms. The particular triangle distribution algorithm may be chosen that optimizes the number of triangle surfaces of constant gradient, as such surfaces can then be subsequently implemented in the wayline transformation discussed in more detail below. In some embodiments, the Delaunay triangulation algorithm may be used to arrange triangle over the point map. As illustrated in FIG. 29, the Delaunay triangulation algorithm distributes triangles over the point map such that a circle drawn through any three points of a triangle arranged on the point map will not contain or pass through any other points. A benefit of the Delaunay triangulation algorithm is that the triangles are as equi-angular as possible, thus optimizing the number of triangle surfaces of constant gradient. As noted earlier, a completed TIN is illustrated in FIG. 27, in which a plurality of triangular surfaces are arranged so as to represent the three-dimensional surface of a field. As should be understood, each triangle used in a TIN represents a surface section of the field.

To aid in the description of the following step, an additional TIN 70 for rectangular field (or for a rectangular portion of a field) is illustrated in FIG. 30. As described for the TIN above, the TIN 70 is a three-dimensional representation of the surface of a field. The TIN 70 includes the boundary of the field, as well as four triangular surfaces distributed over the interior of the field to represent the surface contour of the field. As will be described in more detail below, the TIN 70 can be used to generate swaths of parallel waylines within a two-dimensional land map 72.

To begin, a wayline 74 is generated on the two-dimensional land map 72 (illustrated above TIN 70 in FIG. 30). A wayline is understood to mean a path between two locations. The wayline 74 extends in a straight line between a starting point 76 and an ending point 78. To create a wayline parallel to wayline 74, it can be innaccurate to use only the two-dimensional land map 72 because surface contours of the field are not sufficiently represented on the two-dimensional land map 72. For example, if a parallel wayline (not shown in FIG. 30) was generated on the two-dimensional land map 72 at a specified distance from the wayline 74, such parallel wayline (although appearing parallel in the two-dimensional land map 72) would not actually be parallel in the physical, three-dimensional field. Such discrepancy is due generally to the insufficiency of two-dimensional land map to sufficiently present three-dimensional surface contours. Nevertheless, embodiments of the present invention provide for the generation of swaths of substantially parallel waylines on the two-dimensional land map by using a TIN, such as TIN 70.

In more detail, embodiments can provide for the wayline 74 to be transformed from the two-dimensional land map 72 onto the TIN 70 by projecting the wayline 74 onto the TIN 70, as shown in FIG. 30. The projection used to transform the wayline 74 onto the TIN 70 is a parallel projection. Because the TIN 70 represents a three-dimensional surface, the wayline 74 will be projected onto the TIN 70 as a segmented wayline 84, which includes starting point 86, ending point 88, and one or more line segments extending between the starting point 86 and the ending point 88 through the intervening triangles that represent the three-dimensional surface of the TIN 70. Specifically, the line segments of the projected wayline 84 each have entry and exist points by which the wayline 84 enters and exits, respectively, a particular triangle of the TIN 70. For example, a first segment 90 of the wayline 84 has an entry point into its triangle at the starting point 86 of the wayline 84. The first segment 90 has an exit point from its triangle across the triangle on an opposing side of the triangle. A second segment 92 of the wayline 84 has an entry point for its triangle at the exit point for the first segment 90. A similar arrangement follows for a third segment 94 and a fourth segment 96 of the wayline 84. Finally, an exit point of the fourth segment 96 corresponding with the ending point 88 of the wayline 84.

With reference to FIG. 31, embodiments of the present invention generate a parallel wayline 100 on the TIN 70, with the parallel wayline 100 being parallel to and spaced a predetermined distance from the wayline 84. Specifically, for each segment of the wayline 84, a parallel segment is formed across the same triangle as the segment of the original wayline 84. For example, a first segment 102 of wayline 100 can be formed parallel with the first segment 90 of the wayline 84 and through the same triangle as the first segment 90. To create such a parallel first segment 102, an entry point of the first segment 102 is generated at the predetermined distance from the entry point of the first segment 90 along the same side of the triangle as the entry point of the first segment 90. An exit point of the first segment 102 is generated at the predetermined distance from the exit point of the first segment 90 along the same side of the triangle as the entry point of the first segment 90. The first segment 102 of wayline 100 can then be generated by forming a straight line connecting the entry and exit points of the first segment 102. In some embodiments, the first segment 90 of wayline 84, the first segment 102 of wayline 100, and connecting portions connecting the entry points of the first segments 90, 102 and the exit points of the first segments 90, 102 may be combined to form a trapezoidal shape.

Similarly, a second segment 104 of wayline 100 can formed parallel with the second segment 92 of the wayline 84 and through the same triangle as the second segment 92; a third segment 106 of wayline 100 can be formed parallel with the third segment 94 of the wayline 84 and through the same triangle as the third segment 94; and a fourth segment 104 of wayline 100 can be formed parallel with the fourth segment 96 of the wayline 84 and through the same triangle as the fourth segment 96. As with the wayline 84, adjacent segments of the wayline 100 share a common entry and/or exit point. Furthermore, parallel segments of waylines 84, 100 can each be presented as trapezoids. For example, the parallel segments of waylines 84, 100 can be, as illustrated in FIG. 31, presented as four trapezoids. Such trapezoids may be combined to form the swath of parallel waylines 84, 100 on the TIN 70, as is shown in FIG. 31.

Once the waylines 84, 100 with the parallel segments are formed on the TIN 70, embodiments provide for such waylines to be projected back onto the two-dimensional land map 72 to form original wayline 74 and new wayline 110, as shown in FIG. 31. In some embodiments, original wayline 74 may have been retained on the two-dimensional land map 72 such that it does not have to be recreated, and only wayline 100 is projected onto the two-dimensional land map 72 to form new wayline 110. As can be seen from the two-dimensional land map 72 of FIG. 31, wayline 110 does not appear to be parallel with wayline 74. However, the two-dimensional land map 72 is simply a two-dimensional model that does not accurately display three-dimensional surface contours. Nevertheless, because the waylines 84, 102 were generated to be parallel on the TIN 70, which estimates actual three-dimensional surface contours of the field, the projection of such waylines 84, 102 onto the two-dimensional land map 72 from the TIN 70 are parallel to a very high accuracy. Stated differently, traversing the physical field by following the wayline 74 and then the wayline 110 of the two-dimensional land map 72 would result in traversing a swath of parallel waylines. Embodiments may provide for the generation of a plurality of swaths of parallel waylines on the two-dimensional land map using a process similar to that described above.

Embodiments of the invention described and illustrated herein include waylines defined by a straight line or straight line segments. It will be understood, however, that the invention is not so limited and that non-straight waylines may be used. By way of example, circular waylines (such as those illustrated in FIG. 7) or contoured waylines may be used. These waylines may be segmented, for example, in a plurality of straight line segments to form the target shape.

Turning now to FIG. 32, embodiments of the present invention generate a contoured wayline 120 in a two-dimensional land map 72, the wayline 120 comprising multiple segments 121, 122, 123, 124, 125 and 126. Some of the segments 121, 122, 123, 124, 125 and 126 have start points and/or end points inside of a single triangle of the TIN 70, while other segments only have start and an end points on the edges of triangles of the TIN 70 or, in other words, at points where the wayline enters and exists the triangle. In some cases two or more line segments may form a single straight line in the two-dimensional land map 72.

Similar to FIG. 31, embodiments of the present invention generate a parallel wayline 130 on the TIN 70, with the parallel wayline 130 being parallel to and spaced a predetermined distance from the wayline 120. More specifically, for each segment of the wayline 120, a parallel segment is formed across the same triangle relative to the segment of the original wayline 120. For example, a first segment 131 of wayline 130 can be formed parallel with the first segment 121 of the wayline 120 and through the same triangle as the first segment 121. A second segment 132 of wayline 130 can be formed parallel with the second segment 122 of the wayline 120 and through the same triangle as the second segment 122, which is the same triangle as with first segment 121 as both are one the same triangle. A third segment 133 of wayline 130 can then be formed parallel with the third segment 123 of the wayline 120 but through an adjacent triangle of TIN 70. Further segments 134, 135 and 136 can be formed accordingly. Details regarding the creation of line segments 131, 132, 133, 134, 135, 136 by offsetting starting points and ending points of the respective line segment are similar to those described in relation to FIG. 31 and therefore are not explained hereinafter.

Referring now to FIG. 33, embodiments of the present invention generate a pivot wayline 140 in a two-dimensional land map 72 which comprises multiple segments 141, 142, 143 and so forth, wherein the line segments have start points and end points lying on a circle about center point 160. According to one embodiment of the invention, the triangles are created between the three points corresponding to the center point 160 and the start point and end point of a segment. By way of example, center point 160, start point 151 and end point 152 of the segment 141 define a triangle. This is repeated for the segments 141, 142, 143 and so forth, to create TIN 70. The segments may be determined as described above in relation to FIGS. 7-9. The number of segments depends on the setting, for example a larger number of line segments may be used to achieve higher accuracy. The further details regarding the creation of line segments to finally generate the parallel wayline 170 being parallel to and spaced a predetermined distance from the pivot wayline 140 are similar with those described in FIG. 31 and therefore not explained hereinafter. This may be an alternative approach to the embodiment of the invention illustrated in FIGS. 3 through 18.

The above embodiments include systems and methods for generating a two-dimensional land map of a field, which includes swaths of two or more parallel waylines. Embodiments can use the waylines to accurately guide mobile machines 12 through the field. For instance, the guidance controller 18 of the present invention may use the generated two-dimensional land map to guide a mobile machine 12 along the parallel waylines formed on the land map. Specifically, the guidance controller 18 may instruct a mobile machine 12, such as a tractor, to traverse the field along the first wayline and, then, to subsequently traverse the field along the second, parallel wayline. As such, the mobile machine 12 can be guided to efficiently operate and/or traverse over the field using swaths of parallel waylines. Although such land map is two-dimensional, the parallel waylines have been compensated to account for the three-dimensional terrain of the field by use of the TIN. As such, movement and/or operation of the mobile machines 12 can be accurately and efficiently guided using only such two-dimensional land maps. Furthermore, because the land map is two-dimensional, the land map can be stored, such as in the mapping device 16, efficiently without requiring significant amounts of data storage. Similarly, the processing requirements for guidance systems, such as guidance controller 18, can be minimized when using the two-dimensional land map to guide the movement and/or operation of the mobile machines 12. The ability of the user to control the number of points (and thus data) used within the TIN, so as to further personalize or reduce storage and processing needs.

As mobile machines 12 are being guided during operation or traversal of the field, the mobile machines 12 can continue to collect field data. Such field data can be analyzed against a number of accuracy and cost factors to gauge whether the collected field data will provide an improvement over the previously-obtained field data and/or of the previously-generated land maps. If an improvement is likely, the newly-obtained field data may be used to re-evaluate and improve the accuracy of the land map which was previously generated. This iterative process can be used to adjust and improve the land map with respect to changes in a field's terrain arising from ground work, erosion, or the like. As such, the previous steps of generating a land map with swaths of parallel waylines can then be completed again, providing the user with a more accurate guidance for future work.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology may include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, steps, processes, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems or one or more hardware modules of a computer system (e.g., a processor or a group of processors) may be configured by software (e.g., an application or application portion) as computer hardware that operates to perform certain operations as described herein.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Although the invention has been described with reference to the embodiments illustrated in the attached drawing figures, it is noted that equivalents may be employed and substitutions made herein without departing from the scope of the invention as recited in the claims.

We claim:

1. A mapping system for generating terrain-adjusted paths on a two-dimensional land map of a land area, said mapping system comprising:
   a first mobile machine for traversing a path through the land area;
   at least one sensor associated with said first mobile machine, wherein said at least one sensor is configured to capture position data as said first mobile machine traverses the path;
   a mapping device comprising a processor and a non-transitory computer readable storage medium with a computer program stored thereon, wherein the computer program instructs the processor to perform the following steps—
      receive position data indicative of the path through the land area, wherein the position data is used to generate a three-dimensional model path representative of the path in the land area,
      generate a reference path on the two-dimensional land map, with the reference path being indicative of the three-dimensional model path,
      determine a center point for the three-dimensional model path,
      partition the three-dimensional model path into a plurality of segments, with each segment including a segmentation point lying on the three-dimensional model path,
      determine a radial vector between the center point and each segmentation point, and
      generate one or more subsequent paths on the two-dimensional land map, with the one or more subsequent paths being spaced apart from the reference path by a distance that is based, in part, on the radial vectors, and
   a second mobile machine and a guidance controller for controlling operation of said second mobile machine, wherein said guidance controller is configured to control said second mobile machine based on the reference path and/or the one or more subsequent paths included on the two-dimensional land map.

2. The mapping system of claim 1, wherein said first mobile machine comprises a manually-operated wheeled vehicle.

3. The mapping system of claim 1, wherein said at least one sensor comprises a position determining device in the form of a global positioning system receiver.

4. The mapping system of claim 1, wherein said mapping device comprises computing device positioned remotely from said first mobile machine, and wherein said mapping device is configured to be in communication with said at least one sensor via a communications network.

5. The mapping system of claim 1, wherein the received position data is captured by said at least one sensor and transmitted from said first mobile machine to said mapping device.

6. The mapping system of claim 1, wherein the three-dimensional model path comprises a closed curve around the center point.

7. The mapping system of claim 1, wherein each radial vector forms an angle with the two-dimensional land map, wherein the one or more subsequent paths are spaced apart from the reference path by a distance based, in part, on the angles of the radial vectors.

8. The mapping system of claim 1, wherein the three-dimensional model path is segmented by a datum plane orthogonal to the two-dimensional land map and extending through the center point.

9. The mapping system of claim 8, wherein the computer program further instructs the processor to perform the following step—
  rotate the datum plane about the center point to intersect the three-dimensional model path at each segmentation point.

10. The mapping system of claim 9, wherein the computer program further instructs the processor to perform the following steps—
  receive position data indicative of additional paths around the land area, wherein the position data for the additional paths is used to generate additional three-dimensional model paths representative of the additional paths around the land area,
  partition the additional three-dimensional model paths into a plurality of segments, with each segment including a segmentation point lying on the additional three-dimensional model path.

11. The mapping system of claim 10, wherein the additional three-dimensional model paths are segmented by the datum plane extending through the three-dimensional model path and each of the additional three-dimensional model paths to generate the segmentation points.

12. The mapping system of claim 11, wherein the computer program further instructs the processor to perform the following step—
  wherein for the segmentation points generated on the three-dimensional model path and the additional three-dimensional model paths by a particular rotation of the datum plane, generate a height vector between adjacent segmentation points.

13. The mapping system of claim 12, wherein one or more of the one or more subsequent paths are spaced apart from each other by a distance that is based, in part, on one or more of the height vectors.

14. A mapping system for generating terrain-adjusted paths on a two-dimensional land map of a land area, said mapping system comprising:
  one or more computing devices configured to—
    receive position data from one or more position determining sensors associated with a first mobile machine, wherein the position data is indicative of a path through a portion of the land area,
    generate a three-dimensional model path representative of the path through the land area,
    project the three-dimensional model path onto the two-dimensional land map to obtain a reference path on the two-dimensional land map,
    determine a center point for the three-dimensional model path,
    identify a segmentation point lying on the three-dimensional model path,
    determine a radial vector between the center point and the segmentation point, and
    generate one or more subsequent paths on the two-dimensional land map, with the one or more subsequent paths being spaced apart from the reference path by a distance that is based, in part, on an angle of the radial vector, and
  a second mobile machine and a guidance controller for controlling operation of said second mobile machine, wherein said guidance controller is configured to control said second mobile machine based on the reference path and/or the one or more subsequent paths included on the two-dimensional land map.

15. The mapping system of claim 14, wherein the angle of the radial vector is an angle made by the radial vector with respect to the two-dimensional land map.

16. A mapping system for generating terrain-adjusted paths on a two-dimensional land map of a land area, said mapping system comprising:
  one or more computing devices configured to—
    receive position data from one or more position determining sensors associated with a first mobile machine, wherein the position data is indicative of two or more paths through a portion of the land area,
    generate a three-dimensional model path for each path through the land area,
    intersect the three-dimensional model paths with a datum plane, wherein the intersection of the datum plane at each three-dimensional model path corresponds with a segmentation point,
    determine a height vector between adjacent segmentation points, and
    generate one or more subsequent paths on the two-dimensional land map, with the one or more subsequent paths being spaced apart from one another by a distance that is based, in part, on the height vector, and
  a second mobile machine and a guidance controller for controlling operation of said second mobile machine, wherein said guidance controller is configured to control said second mobile machine based on the reference path and/or the one or more subsequent paths included on the two-dimensional land map.

* * * * *